United States Patent
Miao et al.

(10) Patent No.: US 8,467,358 B2
(45) Date of Patent: Jun. 18, 2013

(54) MOBILE AGENT, RADIO ACCESS NETWORK, AND NETWORK ADAPTATION METHOD

(75) Inventors: Lijing Miao, Shenzhen (CN); Jian Wu, Shenzhen (CN); Zongfang Cui, Shenzhen (CN); Jun Zhu, Shenzhen (CN); Yongzhi Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 315 days.

(21) Appl. No.: 12/774,358

(22) Filed: May 5, 2010

(65) Prior Publication Data

US 2010/0215015 A1    Aug. 26, 2010

Related U.S. Application Data

(63) Continuation of application No. PCT/CN2008/072903, filed on Oct. 31, 2008.

(30) Foreign Application Priority Data

Nov. 5, 2007 (CN) .......................... 2007 1 0047976

(51) Int. Cl.
*H04L 12/28* (2006.01)
*H04W 4/00* (2009.01)

(52) U.S. Cl.
USPC ........... 370/338; 370/230; 370/342; 370/345; 370/468; 370/217; 370/220; 370/329; 370/235; 714/758

(58) Field of Classification Search
USPC .................................. 370/328–463
See application file for complete search history.

(56) References Cited

U.S. PATENT DOCUMENTS

| | | | | |
|---|---|---|---|---|
| 7,423,962 B2 * | 9/2008 | Auterinen | ...................... | 370/216 |
| 7,751,379 B2 * | 7/2010 | Verkama et al. | .............. | 370/338 |
| 8,000,701 B2 * | 8/2011 | Dawson | ........................ | 455/433 |
| 8,000,702 B2 * | 8/2011 | Dawson et al. | ............... | 455/433 |
| 8,019,339 B2 * | 9/2011 | Dawson | ........................ | 455/433 |

(Continued)

FOREIGN PATENT DOCUMENTS

| CN | 1173588 A | 2/1998 |
|---|---|---|
| CN | 1414804 A | 4/2003 |

(Continued)

OTHER PUBLICATIONS

First Office Action (with Partial Translation) Issued in corresponding Chinese Patent Application No. 200710047976.4, mailed on Apr. 4, 2010.
Written Opinion of the International Searching Authority issued in corresponding PCT Application No. PCT/CN2008/072903, mailed Feb. 5, 2009.

(Continued)

*Primary Examiner* — Ayaz Sheikh
*Assistant Examiner* — Venkatesh Haliyur
(74) *Attorney, Agent, or Firm* — Brinks Hofer Gilson & Lione

(57) ABSTRACT

A Mobile Agent (MA), a Radio Access Network (RAN), and a network adaptation method are disclosed herein. The MA is connected to an access layer of an air interface protocol stack for a first network and an access layer of a Core Network (CN) interface protocol stack for a second network to adapt and forward signaling messages and data sent by a Mobile Station (MS) of the first network and a CN of the second network. In the network evolution process, the MA achieves backward compatibility of the MS and the network, and enables smooth evolution.

17 Claims, 25 Drawing Sheets

U.S. PATENT DOCUMENTS

| | | | |
|---|---|---|---|
| 8,165,574 B2 * | 4/2012 | Hallenstal et al. ............. | 455/418 |
| 8,243,665 B2 * | 8/2012 | Lee et al. ...................... | 370/329 |
| 8,347,174 B2 * | 1/2013 | Chun et al. .................... | 714/758 |
| 2007/0293215 A1 * | 12/2007 | Dawson ........................ | 455/433 |
| 2007/0293239 A1 * | 12/2007 | Dawson et al. ............. | 455/456.1 |
| 2007/0298793 A1 * | 12/2007 | Dawson ..................... | 455/435.1 |
| 2008/0240037 A1 | 10/2008 | Bedekar et al. | |
| 2010/0215015 A1 * | 8/2010 | Miao et al. .................... | 370/329 |
| 2011/0075557 A1 * | 3/2011 | Chowdhury et al. ......... | 370/230 |
| 2011/0116460 A1 * | 5/2011 | Kovvali et al. ................ | 370/329 |

FOREIGN PATENT DOCUMENTS

| | | |
|---|---|---|
| CN | 1992984 A | 7/2007 |
| CN | 101001455 A | 7/2007 |
| WO | 03/037011 A1 | 5/2003 |
| WO | 2007/001954 A1 | 1/2007 |

OTHER PUBLICATIONS

International Search Report issued in corresponding PCT Application No. PCT/CN2008/072903; mailed Feb. 5, 2009.

* cited by examiner

MOBILE AGENT, RADIO ACCESS NETWORK, AND NETWORK ADAPTATION METHOD

CROSS-REFERENCE TO RELATED APPLICATIONS

This application is a continuation application of International Application No. PCT/CN2008/072903, filed on Oct. 31, 2008, which claims priority to Chinese Patent Application No. 200710047976.4, filed on Nov. 5, 2007, both of which are hereby incorporated by reference in their entireties.

FIELD OF THE INVENTION

The disclosure relates to mobile communications, and in particular, to a Mobile Agent (MA), a Radio Access Network (RAN), and a network adaptation method.

BACKGROUND OF THE INVENTION

Multiple mobile communication systems have been developed in the evolution of mobile communications, for example, the second Generation (2G) mobile telecommunications system, and the third Generation (3G) mobile telecommunications system. The 2G includes: Global System for Mobile Communications (GSM), General Packet Radio System (GPRS), Enhanced Data rates for GSM Evolution (EDGE), Code Division Multiple Access (CDMA); and the 3G includes: Universal Mobile Telecommunications System (UMTS), Wideband CDMA (WCDMA), Time Division—Synchronous CDMA (TD-SCDMA), and Next Generation Network (NGN) system such as Long Term Evolution (LTE). The major difference between the mobile telecommunications systems is the radio air interface technology. Different networks match different radio air interface standards. The Radio Access Network (RAN) and the Core Network (CN) of one system are different from the RAN and the CN of another system in the network architecture and the protocol stack.

The GPRS is overlaid onto the existing GSM network, and a packet switching function entity is introduced into the GSM network to support the packet services for mobile subscribers. The structure of the GPRS transmission protocol stack is shown in FIG. 1.

The Mobile Station (MS) is a function unit that provides application interfaces and services for the user, and is responsible for the communication with another corresponding entity on the network over the radio interface. The functions and the overall protocol structure of the MS comply with standards. Messages are transmitted between the MS (such as the mobile phone and vehicle-mounted station) and the BSS through a Um interface, and the CN interface between the BBS and the Serving GPRS Support Node (SGSN) is a Gb interface. The Gb interface uses Frame Relay (FR) for lower-layer transmission, and uses the BSS GPRS protocol (BSSGP) for signaling management. The signaling transmission shares a protocol stack with data transmission below the Logical Link Control (LLC) layer. That is, the control plane (control signaling plane) of the Gb interface is not separated from the user plane (user transmission plane), and the transmission resources are shared by the control plane and the user plane. On the user plane, data is transmitted between the MS and the SGSN via a Sub-Network Dependent Convergence Protocol (SNDCP). On the control plane, a GPRS Mobility Management/Session Management (GMM/SM) protocol (which is not illustrated in the figure) is applied between the MS and the SGSN to implement mobility management and network access control.

The EDGE is an enhancement of the GPRS. The EDGE provides new modulation modes and channel coding to improve the Packet Switched (PS) service bandwidth. The change between the EDGE and the GPRS is limited to the Radio Link Control (RLC) and Media Access Control (MAC) protocol layers and physical layers of the air interface, and the GPRS network architecture remains unchanged in the EDGE. Theoretically, the maximum data rate of each MS in the GPRS is 160 Kbit/s; and when the EDGE air interface uses 8 timeslots, the maximum data rate of the EDGE is 473 Kbit/s.

The WCDMA and TD-SCDMA systems are 3G mobile telecommunications systems, and their maximum data rate is up to 2000 Kbit/s. They employ almost the same CN specifications, but employ different air interface technologies. High-Speed Packet Access (HSPA) is an improvement of the WCDMA air interface technology, and increases the data rate of the PS services. The BSS of the UMTS is a UMTS Terrestrial Radio Access Network (UTRAN), which is interfaced with the CN through an Iu interface. The PS interface is an Iu PS interface, and the protocol stack structure of the Iu PS interface of the UMTS is shown in FIG. 2.

The Iu interface is an open standard interface. The control plane protocols of the Iu PS interface include: the Radio Access Network Application Protocol (RANAP), Signaling System Number 7 (SS7), and Stream Control Transmission Protocol (SCTP); the user plane protocols of the Iu PS interface include: the GPRS Tunneling Protocol for User Plane (GTPU), and User Datagram Protocol (UDP).

The LTE system is a long term evolution project of the third Generation Partnership Project (3GPP), and its core is an all-IP, wireless broadband and flat architecture. The flat network architecture of the LTE system includes two layers. Its CN interface is an S1 interface; its protocol stack structure is shown in FIG. 3; and the S1 interface is a RANAP improvement based on the Iu interface. On the control plane, the S1 interface application protocol (S1-AP) replaces the RANAP of the Iu-PS interface; on the user plane, the enhanced GTPU (namely, GTPU') is applied. Currently, the standards are being developed for the LTE system.

Mobile telecommunications networks need to evolve toward the NGN to support new service requirements and cater for the fast development of data services. According to the relation between 3GPP standards, the network may evolve along different paths: evolution from 2G to 3G and NGN, for example, GPRS (EDGE)→WCDMA (HSPA)→LTE; or evolution from 2G to NGN directly, for example, GPRS (EDGE) →LTE; or evolution in the same generation with some improvements in technology and performance, for example, GPRS→EDGE, and GPRS (EDGE)→GSM EDGE RAN (GERAN).

The existing GPRS (EDGE) network evolution involves the following defects:

The control plane is not separated from the user plane of the Gb interface of the GPRS network, and the resources are shareable to all users. The Gb interface of the GPRS network is sharply different from the 3G CN interface where the control plane is separated from the user plane, and the network evolution is difficult.

After the air interface technology is improved for the GPRS (EDGE) network, the Gb interface bandwidth and the delay constitute a bottleneck. The Gb interface handover is of low quality and can hardly meet the development of the packet data services. Because the Gb interface protocol stack is sharply different from the CN interface protocol stack for the 3G and the NGN, better CN interfaces such as Iu PS and S1 are not directly applicable.

The network upgrade according to network standards is a process of replacing equipment, and the equipment is generally not backward compatible, and the MS of the GPRS (EDGE) network is not applicable in the new network. For example, a GPRS (EDGE) mobile phone is unable to access the CN using the Iu PS interface, which restricts the network evolution.

In practice, network upgrade needs to allow for backward compatibility and smooth evolution to save costs. The order of priority in upgrade is: MS, base station, and then CN. If the operator has plenty of existing networks and the upgrade solution does not ensure backward compatibility with the MS or network, the network upgrade cost is too high. In this case, the existing investments are wasted, and the waste of investments is enormous.

Likewise, the 3G network also needs to evolve toward the unified LTE CN. However, different network systems have different CNs. Therefore, the CN cannot be solely improved during network evolution. The inconsistent CN interfaces make it difficult to perform network interworking and unified management, and hinder the smooth evolution of the network.

As shown in FIG. 4, the 3GPP proposes to use the GERAN Rel'5 as the evolved version of the GSM/EDGE, namely, GPRS (EDGE) evolving to GERAN, which is evolution in the same generation and enables the connection from the 2G network to the 3G CN.

However, as shown in FIG. 1 and FIG. 4, compared with the GPRS (EDGE), the GERAN changes the radio protocol massively and increases the complexity of the air interface protocol; the change of the GERAN radio interface imposes a great impact on the BSS and the MS, and makes it necessary to change the BSS and the MS accordingly. The existing GPRS (EDGE) MS is not applicable in a GERAN network. Therefore, the evolution from the GPRS (EDGE) to the GERAN also lacks smoothness and backward compatibility, and involves a huge waste of the existing investments.

SUMMARY OF THE INVENTION

The embodiments of the disclosure provide an MA, a RAN, and a network adaptation method to achieve backward compatibility of the MS and the network in network evolution and enable smooth evolution of the network.

An MA provided in an embodiment of the disclosure is connected to the access layer of the air interface protocol stack for a first network and the access layer of the CN interface protocol stack for a second network and configured to adapt and forward the signaling messages and data sent by an MS of the first network and a CN of the second network.

A RAN provided in an embodiment of the disclosure includes: an air interface protocol stack for the first network; a CN interface protocol stack for the second network; and a Mobile Agent (MA), connected to an access layer of the air interface protocol stack for the first network and an access layer of the CN interface protocol stack for the second network, and configured to adapt and forward signaling messages and data sent by the MS of the first network and the CN of the second network.

A network adaptation method provided in an embodiment of the disclosure includes: converting a signaling message of an MS of a first network into a signaling message of a CN of a corresponding second network; converting a signaling message of the CN of the second network into a signaling message of the MS of the corresponding first network; forwarding the converted signaling message of the MS of the first network and data on the access layer of the CN interface protocol stack for the second network to the access layer of the air interface protocol stack for the first network; and forwarding the converted signaling message of the CN of the second network and data on the access layer of the air interface protocol stack for the first network to the access layer of the CN interface protocol stack for the second network.

In the embodiments of the disclosure, an MA is applied in the RAN, so that the structures of the access network and the CN are improved on the basis of retaining the air interface, and that the MS of the first network (existing network) is backward compatible, thus protecting the existing investments significantly; the CN is shared with the second network (new network) through replacement of the CN interface, thus improving the network performance and enhancing the evolution capabilities; in the network improvement, the CN interface is basically compliant with standards, and the capabilities of interworking and compatibility between systems are improved; an MA is applied, so that the existing network is little changed, and the solution is easy to implement.

DETAILED DESCRIPTION OF THE EMBODIMENTS

Figure 1:
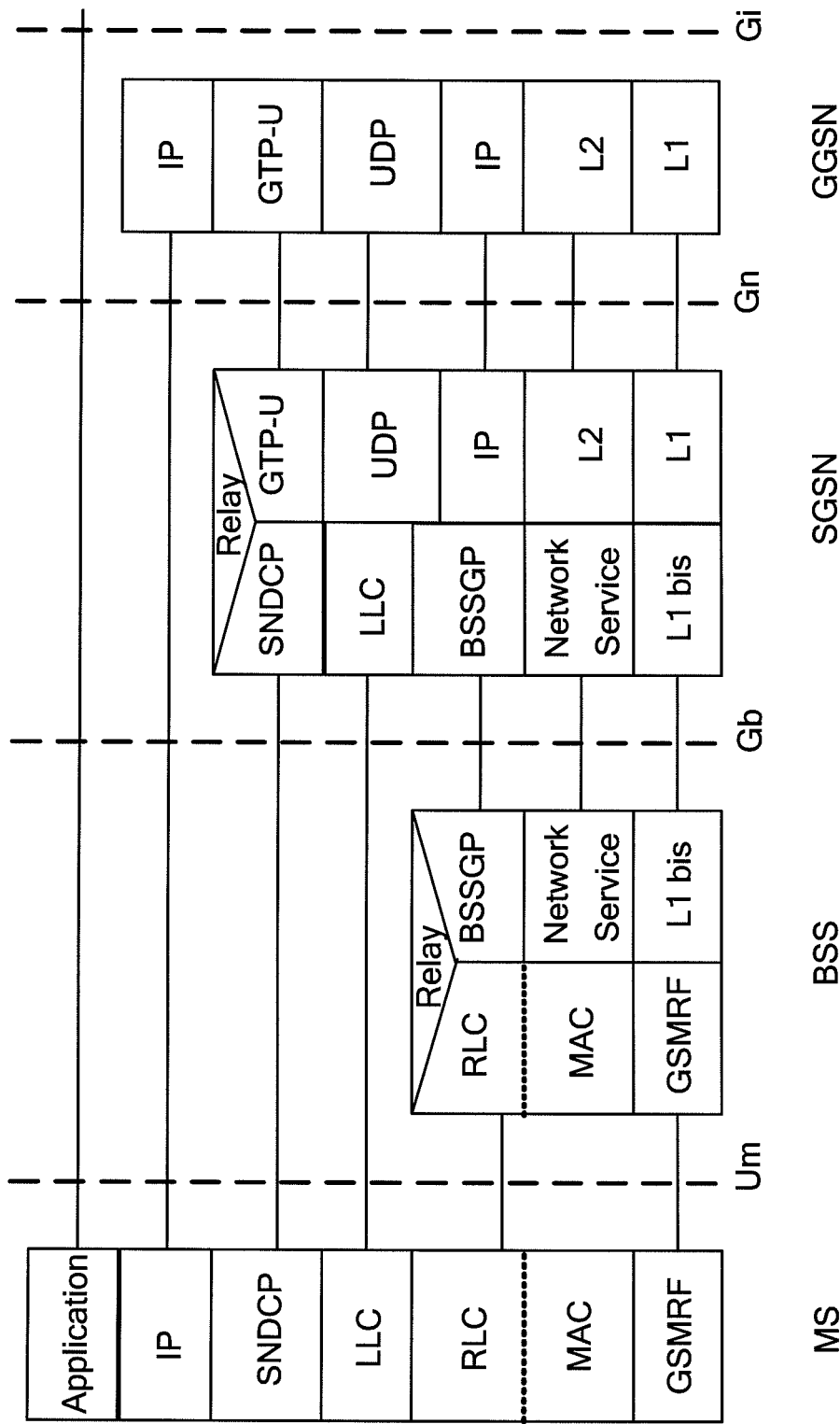
FIG. 1 shows a transmission protocol stack structure of a GPRS (2G)
Figure 2:
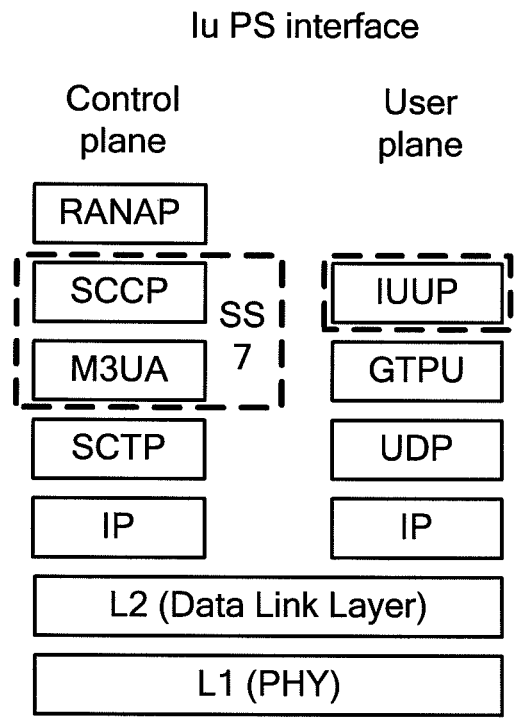
FIG. 2 shows a protocol stack structure of a CN interface (Iu PS interface) of a UMTS (3G)
Figure 3:
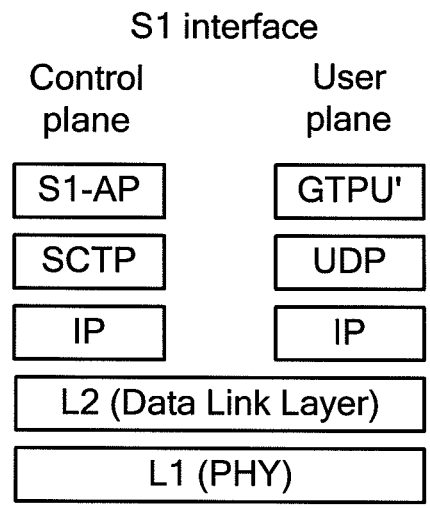
FIG. 3 shows a protocol stack structure of a CN interface (S1 interface) of an LTE system.
Figure 4:
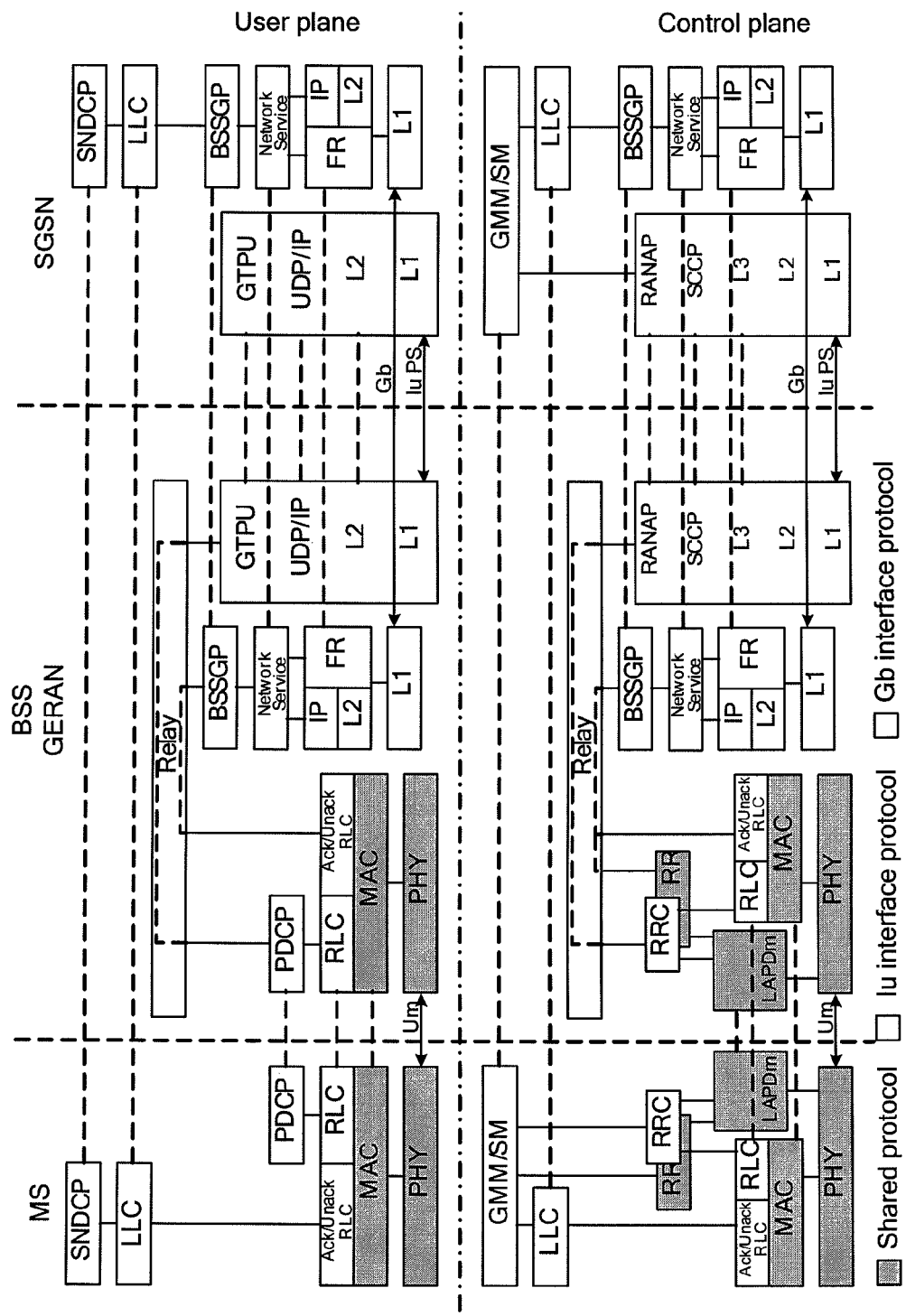
FIG. 4 shows a protocol stack structure of a user plane and a control plane of a GERAN.

The embodiments of the disclosure implement adaptation between the MS and the CN through an MA in a BSS. The MA processes the message sent by the MS in the old network, and converts the message into the message receivable to the CN of the new network, namely, simulates the MS of the new network; and processes the message sent by the CN in the new network, and converts the message into the message receivable to the MS of the old network, namely, simulates the CN of the old network. Therefore, in the system evolution, it is only necessary to implement adaptation through the MA in the BSS; the evolution of the CN does not affect the old MS; and the radio interface (air interface) keeps unchanged.

The MA is connected to the access layer of the air interface protocol stack for the first network (namely, the old network) and the access layer of the CN interface protocol stack for the second network (namely, the new network) and configured to adapt and forward the signaling messages and data sent by the MS of the first network and the CN of the second network.

The MA includes: a control-plane MA, connected to the access layer of the air interface control-plane protocol stack for the first network and the access layer of the CN interface control-plane protocol stack for the second network, and configured to adapt and forward signaling messages sent by the MS of the first network and the CN of the second network; and a user-plane MA, connected to the access layer of the air interface user-plane protocol stack for the first network and the access layer of the CN interface user-plane protocol stack for the second network, and configured to adapt and forward data sent by the MS of the first network and the CN of the second network.

The control-plane MA includes:

a mobility management adapting unit, configured to: convert the signaling message of the MS of the first network into the signaling message of the CN of the corresponding second network, convert the signaling message of the CN of the second network into the signaling message of the MS of the corresponding first network, and keep consistency of the mobility management state between the MS of the first network and the CN of the second network;

a session management adapting unit, configured to: convert the signaling message of the MS of the first network into the signaling message of the CN of the corresponding second network, convert the signaling message of the CN of the second network into the signaling message of the MS of the corresponding first network, and set up or release a user-plane bearer; and a signaling forwarding unit, configured to: forward the converted signaling message of the MS of the first network to the access layer of the air interface control-plane protocol stack for the first network, and forward the converted signaling message of the CN of the second network to the access layer of the CN interface control-plane protocol stack for the second network.

The user-plane MA includes a data forwarding unit, which is configured to forward the data on the access layer of the air interface user-plane protocol stack for the first network to the access layer of the CN interface user-plane protocol stack for the second network, and forward the data on the access layer of the CN interface user-plane protocol stack for the second network to the access layer of the air interface user-plane protocol stack for the first network.

The user-plane MA further includes an identity mapping unit, which is configured to perform identity mapping for the data on the access layer of the air interface user-plane protocol stack for the first network or the access layer of the CN interface user-plane protocol stack for the second network.

Figure 5:
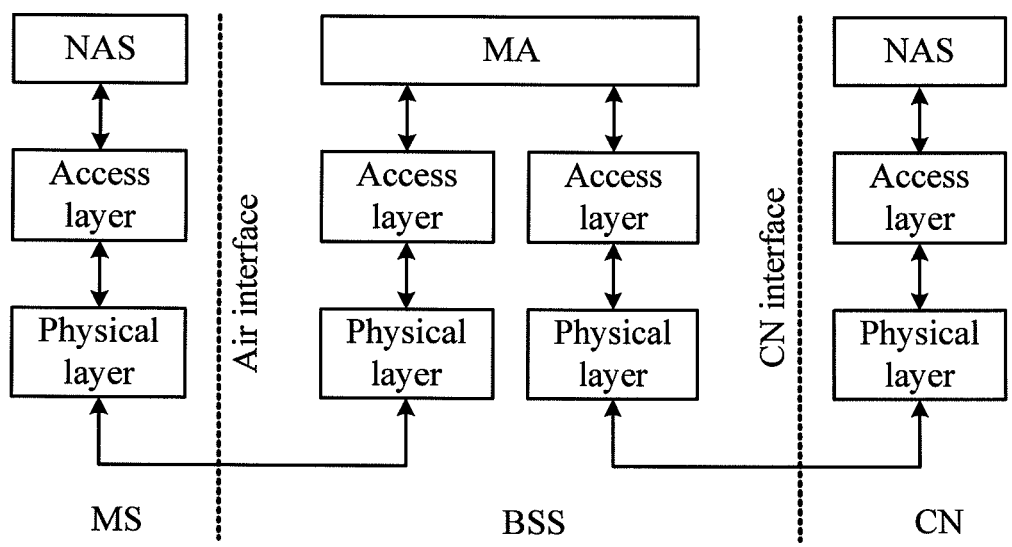
FIG. 5 shows a protocol stack structure of a network system inclusive of an MA in an embodiment of the disclosure.

FIG. 5 shows a protocol stack structure of a network system inclusive of an MA in an embodiment of the disclosure. As shown in FIG. 5, the network system includes an MS, a BSS, and a CN. The MS is in the first network and exchanges signaling messages and data with the BSS through the air interface; the CN is in the second network and exchanges signaling messages and data with the BSS through the CN interface.

The air interface protocol stack structure of the MS in the first network includes a physical layer, an access layer, and a NAS.

The CN protocol stack structure of the CN in the second network includes a physical layer, an access layer, and a NAS.

The BSS includes:

the physical layer and the access layer of the air interface protocol stack for the first network, corresponding to the physical layer and the access layer of the air interface protocol stack of the MS of the first network respectively;

the physical layer and the access layer of the CN interface protocol stack for the second network, corresponding to the physical layer and the access layer of the CN protocol stack of the CN of the second network respectively; and an MA, located in the BSS, and between the air interface of the first network and the CN interface of the second network, and connected to the access layer of the air interface protocol stack for the first network and the access layer of the CN interface protocol stack for the second network, and configured to adapt and forward the signaling messages and data sent by the MS of the first network and the CN of the second network.

In the foregoing BSS, the access layer of the air interface protocol stack for the first network includes the access layer of the air interface control-plane protocol stack for the first network and the access layer of the air interface user-plane protocol stack for the first network; the access layer of the CN interface protocol stack for the second network includes the access layer of the CN interface control-plane protocol stack for the second network and the access layer of the CN interface user-plane protocol stack for the second network.

The MA includes:

a control-plane MA, connected to the access layer of the air interface control-plane protocol stack for the first network and the access layer of the CN interface control-plane protocol stack for the second network, and configured to adapt and forward the signaling messages sent by the MS of the first network and the CN of the second network; and a user-plane MA, connected to the access layer of the air interface user-plane protocol stack for the first network and the access layer of the CN interface user-plane protocol stack for the second network, and configured to adapt and forward the data sent by the MS of the first network and the CN of the second network.

A network adaptation method provided in an embodiment of the disclosure includes:

converting a signaling message of the MS of the first network into a signaling message of the CN of the corresponding second network;

converting the signaling message of the CN of the second network into the signaling message of the MS of the corresponding first network;

forwarding the converted signaling message of the MS of the first network and data on the access layer of the CN interface protocol stack for the second network to the access layer of the air interface protocol stack for the first network; and forwarding the converted signaling message of the CN of the second network and data on the access layer of the air interface protocol stack for the first network to the access layer of the CN interface protocol stack for the second network.

The process of forwarding the converted signaling message of the MS of the first network and the data on the access layer of the CN interface protocol stack for the second network to the access layer of the air interface protocol stack for the first network refers to: forwarding the converted signaling message of the MS of the first network to the access layer of the air interface control-plane protocol stack for the first network and forwarding the data on the access layer of the CN interface user-plane protocol stack for the second network to the access layer of the air interface user-plane protocol stack for the first network.

The process of forwarding the converted signaling message of the CN of the second network and the data on the access layer of the air interface protocol stack for the first network to the access layer of the CN interface protocol stack for the second network refers to: forwarding the converted signaling message of the CN of the second network to the access layer of the CN interface control-plane protocol stack for the second network and forwarding the data on the access layer of the air interface user-plane protocol stack for the first network to the access layer of the CN interface user-plane protocol stack for the second network.

The network adaptation method further includes: keeping consistency of the mobility management state between the MS of the first network and the CN of the second network.

The network adaptation method further includes: performing identity mapping for the data on the access layer of the air interface user-plane protocol stack for the first network or the access layer of the CN interface user-plane protocol stack for the second network.

The technical solution under the disclosure is detailed below with reference to accompanying drawings and exemplary embodiments.

Figure 6:
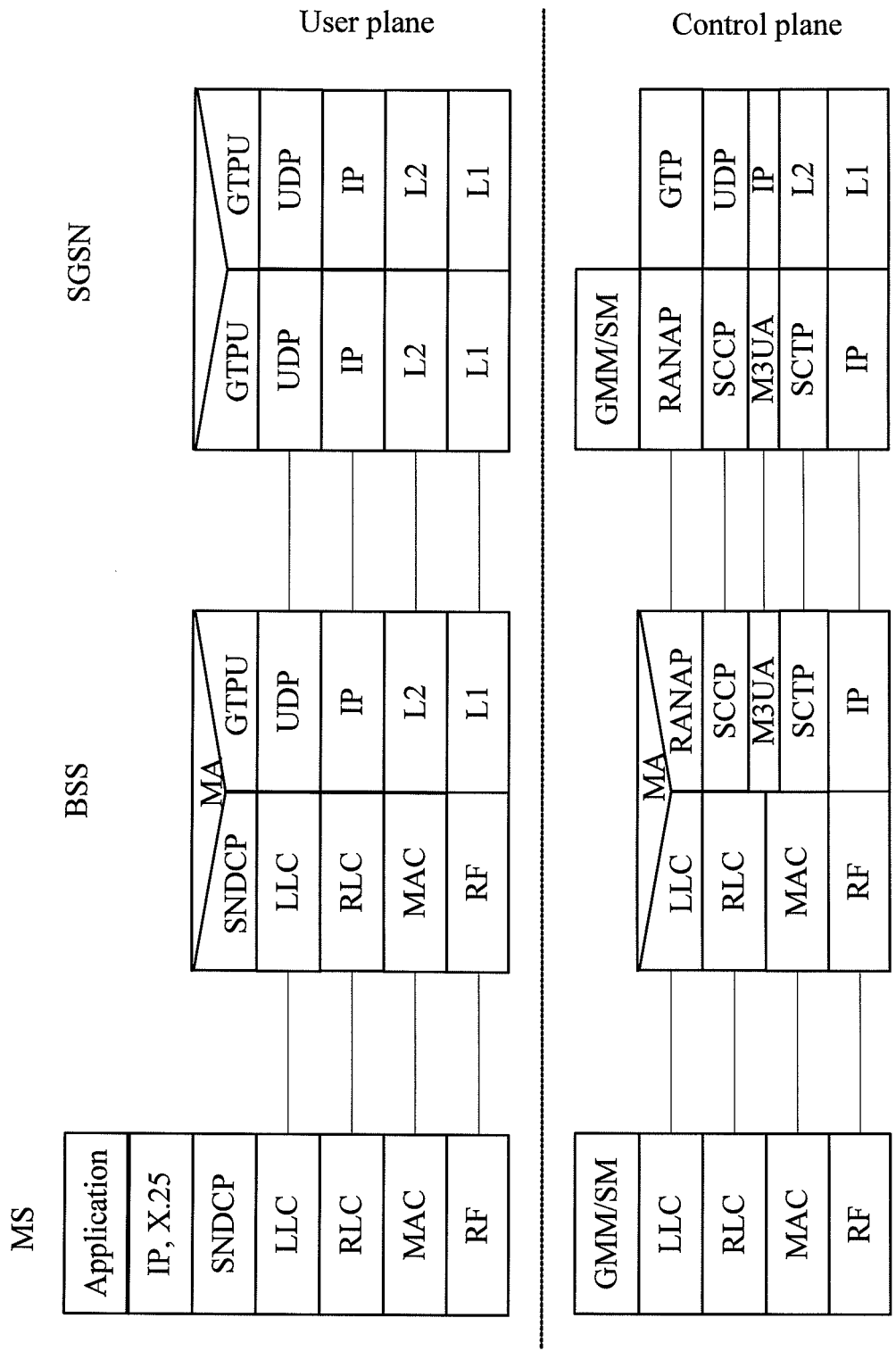
FIG. 6 shows a protocol stack structure of a "GPRS (EDGE)+Iu PS interface" network system in an embodiment of the disclosure.

FIG. 6 shows a protocol stack structure of a "GPRS (EDGE)+Iu PS interface" network system in an embodiment of the disclosure; that is, the old network is a GPRS (EDGE) and the CN in the new network is a UMTS CN. The CN interface is an Iu PS interface in place of the Gb interface. In the BSS, an MA is applied to make the MS and the BSS in the 2G network adaptable to the CN in the 3G network.

The MA in this embodiment includes a control-plane MA and a user-plane MA. The control-plane MA is connected to the access layer of the air interface control-plane protocol stack for the GPRS (EDGE) and the access layer of the Iu-PS interface control-plane protocol stack for the UMTS and configured to adapt and forward the signaling messages sent by the MS of the GPRS (EDGE) and the CN of the UMTS; the user-plane MA is connected to the access layer of the air interface user-plane protocol stack for the GPRS (EDGE) and the access layer of the Iu-PS interface user-plane protocol stack for the UMTS and configured to adapt and forward the data sent by the MS of the GPRS (EDGE) and the CN of the UMTS.

The BSS of the GPRS (EDGE) is directly connected to the SGSN of the 3G through an Iu PS interface. The SNDCP and the LLC protocol of the Gb interface are related to the air interface. Therefore, the SNDCP and the LLC protocol are shifted from the SGSN down to the BSS, and other protocols of the Gb interface are replaced by the protocol of the Iu PS interface. On the control plane, the RANAP of the Iu PS interface replaces the signaling management function of the BSSGP of the Gb interface, and the transport layer uses the SS7 (SCCP, M3UA) as a bearer. On the user plane, the GTPU protocol undertakes the functions of the old user plane of the Gb interface.

On the control plane, the control-plane MA is located above the LLC protocol and RANAP of the BSS protocol stack; on the user plane, the user-plane MA is located above the SNDCP and the GTPU. The MA adapts the signaling process and the user-plane data transmission respectively, including: mobility and handover adaptation, NAS signaling adaptation, signaling forwarding between the LLC and the RANAP, Quality of Service (QoS) parameter mapping between the 3G and the GPRS, security authentication, user-plane addressing and mapping.

The control-plane MA in this embodiment includes a mobility management adapting unit, a session management adapting unit, and a signaling forwarding unit.

The mobility management adapting unit performs adaptation for the mobility process in the following way:

(1) The MA is located between the LLC protocol and the RANAP. The MA adaptation keeps consistency of the Mobility Management (MM) state between the 3G SGSN and the MS, namely, keeps the consistency in the MM state of the UMTS PS domain (PMM) and the MM state of GPRS (GMM). In that process, the MS performs the GMM state process of the GPRS, and the state meaning of the GMM is adjusted to the Iu interface mode; the 3G SGSN performs the PMM state process of the Iu PS interface, and the state meaning of the PMM is the same as that of the Iu interface mode.

(2) In the process of attach, cell update, Routing Area (RA)/location area update, and paging, the MA triggers or controls the RANAP process to perform adaptation, and may construct a NAS message when necessary.

(3) The MA performs parameter conversion for the messages on the NAS or RANAP layer, for example, security authentication parameters and QoS parameters.

The session management adapting unit performs adaptation for the session process in the following way: After the Iu PS interface replaces the Gb interface, the user-plane bearer (including the GTPU tunnel and the air interface resources) is set up/released through a Radio Access Bearer (RAB) assignment process of the RANAP in the session process.

The signaling forwarding unit reciprocally forwards the signaling message of the LLC layer of the air interface control-plane protocol stack for the GPRS (EDGE) and the RANAP layer of the Iu-PS interface control-plane protocol stack for the UMTS.

The user-plane MA in this embodiment includes an identity mapping unit and a data forwarding unit. The identity mapping unit performs adaptation for the user-plane data transmission in this way: After the SNDCP and the LLC protocol are shifted down to the BSS, the maintenance of the Temporary Logical Link Identity (TLLI) is terminated at the BSS, and the MA needs to be responsible for mapping between the TLLI and the GTPU tunnel identity of the Iu interface. The data forwarding unit reciprocally forwards the data on the SNDCP layer of the air interface user-plane protocol stack for the GPRS (EDGE) and the GTPU layer of the Iu-PS interface user-plane protocol stack for the UMTS.

The following describes the service process of the "GPRS (EDGE)+Iu PS interface" network system with reference to FIG. 6, taking FIG. 7A to FIG. 7I as examples.

Figure 7A:
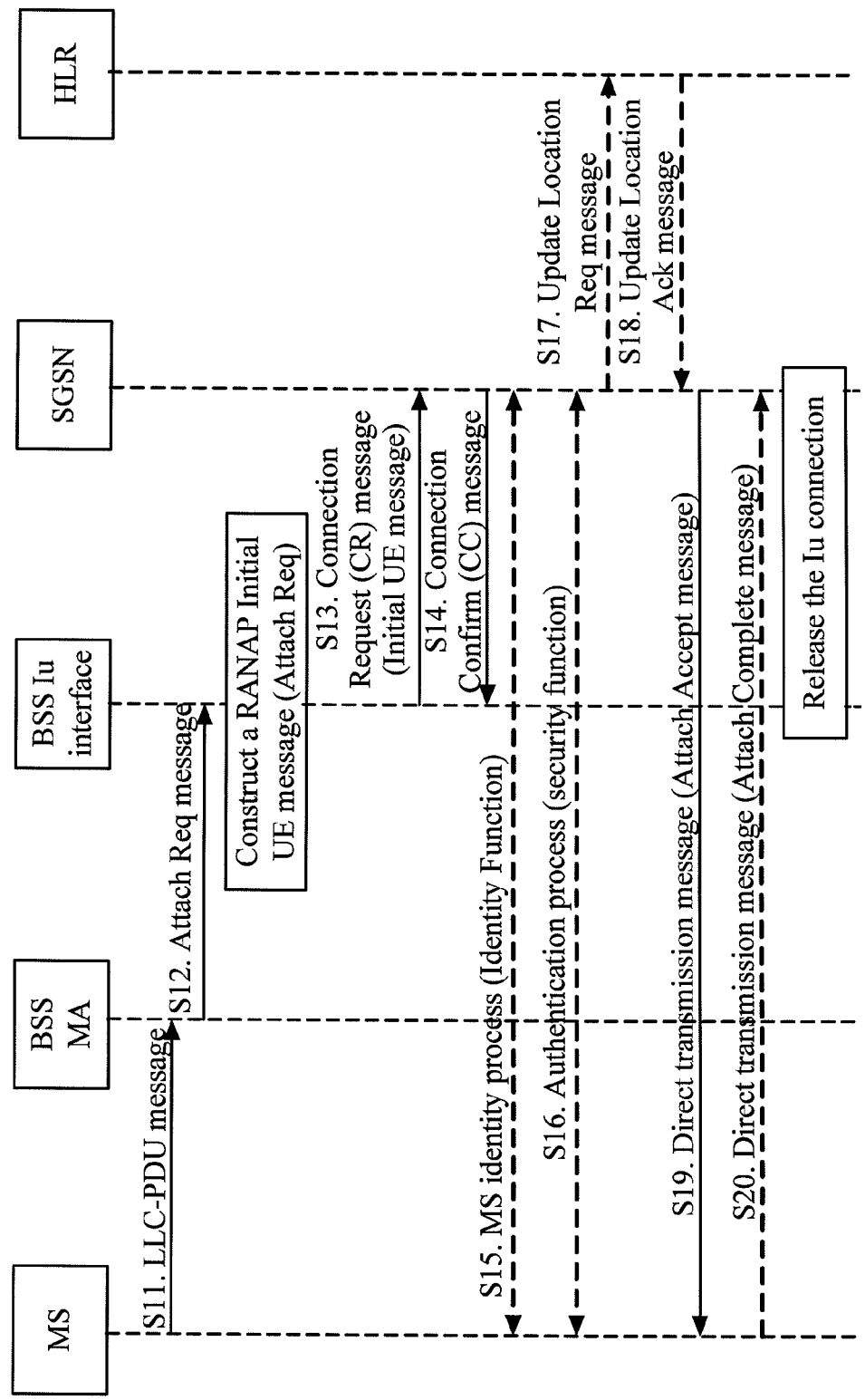
FIG. 7A to FIG. 7I are a flowchart of a message processing method in the service process of the network system shown in FIG. 6.

FIG. 7A is a flowchart of a message processing method of an attach process of the network system shown in FIG. 6. In FIG. 7A, the dotted line indicates optional steps, and the LLC-PDU refers to the upper-layer message sent by the MS through an LLC protocol, namely, a NAS message.

Step S11: The MS of the GPRS (EDGE) initiates an attach process, and sends an LLC-PDU message that carries an Attach Req to the BSS.

Step S12: After receiving the LLC-PDU message, the MA of the BSS performs adaptation for the NAS message of the MS. The adaptation operations include: parsing the LLC-PDU message to obtain the Attach Req message, and performing parameter conversion between the GPRS (EDGE) and the UMTS for the Attach Req message. Afterward, the MA forwards the Attach Req message to the RANAP, and constructs a RANAP Initial UE message that carries the Attach Req.

Step S13: The BSS initiates an Initial UE process, and sends a Connect Request (CR) message that carries an Initial UE message to the SGSN through the Iu interface of the BSS.

Step S14: After receiving the CR message, the SGSN returns a Connect Confirm (CC) message to the BSS through the Iu interface of the BSS, and sets up an Iu connection.

Step S15: The MS identity function process initiated by the SGSN is optional.

Step S16: The security function process initiated by the SGSN is optional.

Step S17 and step S18: The location update process initiated by the SGSN is optional.

In step S17, The SGSN sends an Update Location Req message to the Home Location Register (HLR).

Step S18: The HLR returns an Update Location Ack message to the SGSN.

Step S19: The SGSN returns an Attach Accept message to the MS through a direct transfer message.

Step S20: If the Temporary Mobile Subscriber Identity (TMSI) is updated, the MS returns an Attach Complete message to the SGSN through a direct transfer message. After receiving the Attach Complete message, the SGSN releases the Iu connection.

Figure 7B:
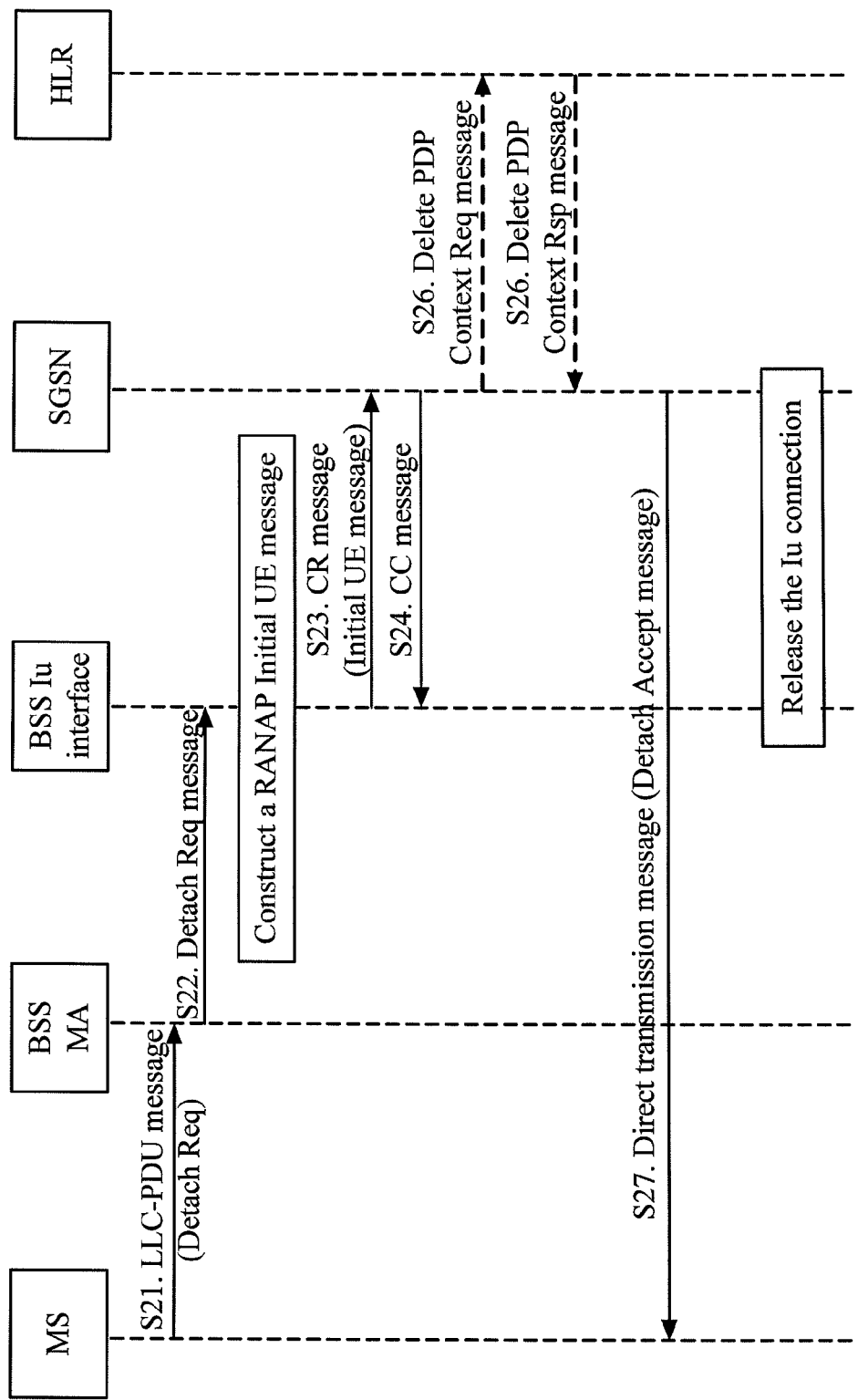

FIG. 7B is a flowchart of a message processing method of a detach process in the network system shown in FIG. 6, where the dotted line indicates optional steps.

Step S21: The MS of the GPRS (EDGE) initiates a detach process, and sends an LLC-PDU message that carries a Detach Req to the BSS.

Step S22: After receiving the LLC-PDU message, the MA of the BSS performs adaptation for the NAS message. The adaptation operations include: parsing the LLC-PDU message to obtain the Detach Req message, and performing parameter conversion between the GPRS (EDGE) and the UMTS for the Detach Req message. Afterward, the MA forwards the Detach Req message to the RANAP, and constructs a RANAP Initial UE message that carries the Detach Req.

Step S23: The BSS initiates an Initial UE process, and sends a CR message that carries an Initial UE message to the SGSN through the Iu interface of the BSS.

Step S24: After receiving the CR message, the SGSN returns a CC message to the BSS through the Iu interface of the BSS, and sets up an Iu connection.

Step S25: The SGSN initiates a process of releasing the Packet Data Protocol (PDP) Context, and sends a Delete PDP Context Req message to a Gateway GPRS Support Node (GGSN).

Step S26: The GGSN returns a Delete PDP Context Rsp message to the SGSN.

Step S27: The SGSN returns a Detach Accept message to the MS through a direct transfer message, and releases the Iu connection.

Figure 7C:
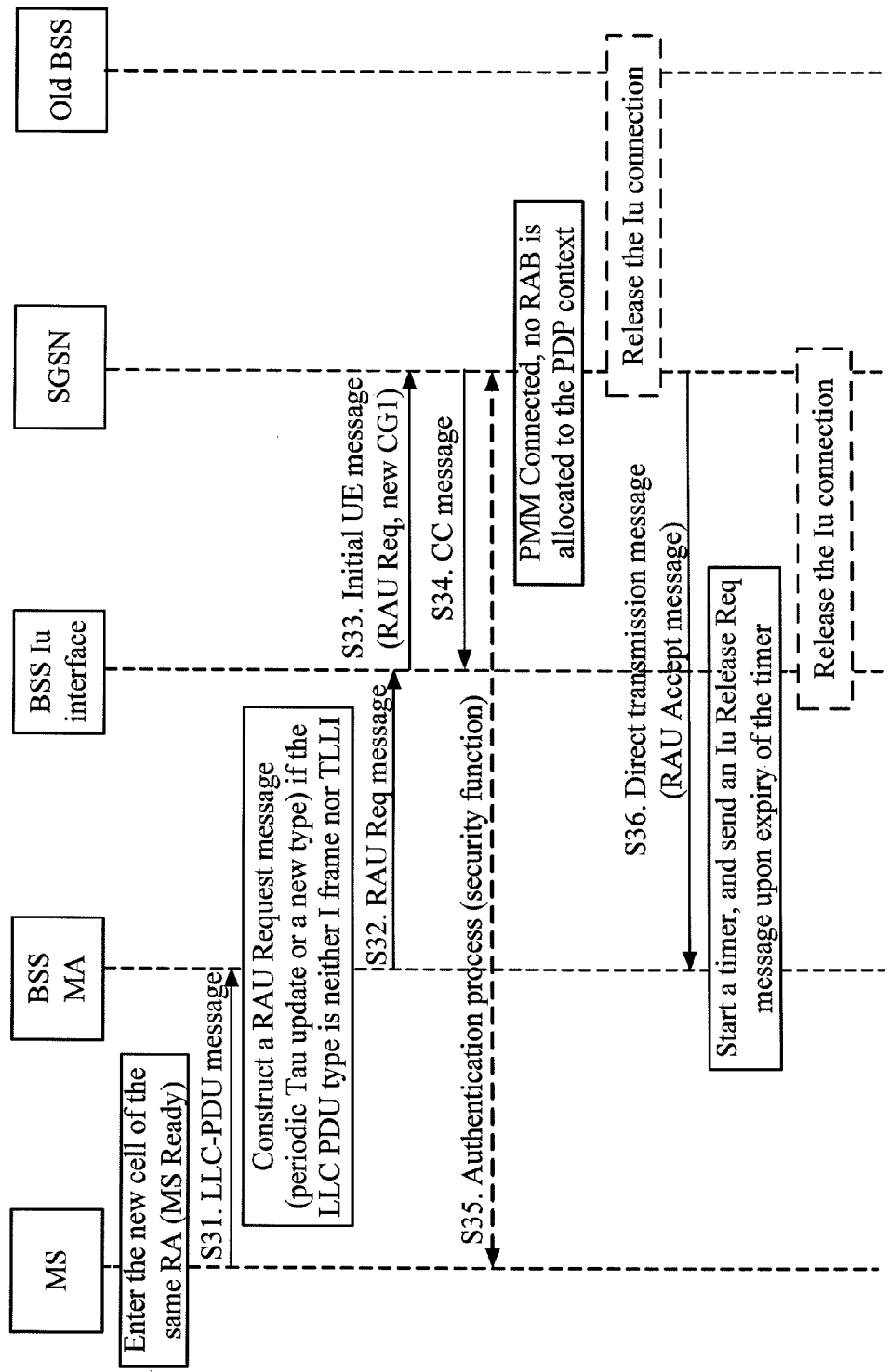

FIG. 7C is a flowchart of a message processing method of a cell update process in the network system shown in FIG. 6, where the dotted line indicates optional steps. The cell update process shown in FIG. 7C uses a Routing Area Update (RAU) Req and is performed inside the SGSN (namely, the SGSN is not changed) when the PDP context is not activated and no service is underway.

Step S31: The MS of the GPRS (EDGE) enters the new cell of the same RA, and sends an LLC-PDU message to the BSS. The GMM state of the MS changes to READY.

Step S32: The MA of the BSS receives the LLC-PDU message, and constructs an RAU Req message (because the RA remains unchanged, "TYPE" needs to be set to "periodic RA update") according to the LLC-PDU type, and forwards the RAU Req message to the Iu interface.

Step S33: The Iu interface of the BSS constructs a RANAP Initial UE message that carries an RAU Req and a new Cell Global Identity (CGI), and sends the Initial UE message to the SGSN.

Step S34: After receiving the CR message that carries the Initial UE message, the SGSN returns a CC message to the BSS through the Iu interface of the BSS, and sets up an Iu connection.

Step S35: The SGSN initiates a security function process.

Step S36: The SGSN determines that the PMM state is CONNECTED, that the PDP context is not activated, and that no RAB is allocated. Therefore, the SGSN releases the Iu connection with the old BSS. Then the SGSN returns an RAU Accept message to the MA of the BSS through a direct transfer message. The MA of the BSS starts a timer. After the timer expires, the MA sends an Iu Release Req to trigger the Iu connection release. The GMM state of the MS changes from READY to STANDBY; and the PMM state of the SGSN changes from CONNECTED to IDLE. That is, the GMM state of the MS keeps consistent with the PMM state of the SGSN.

Figure 7D:
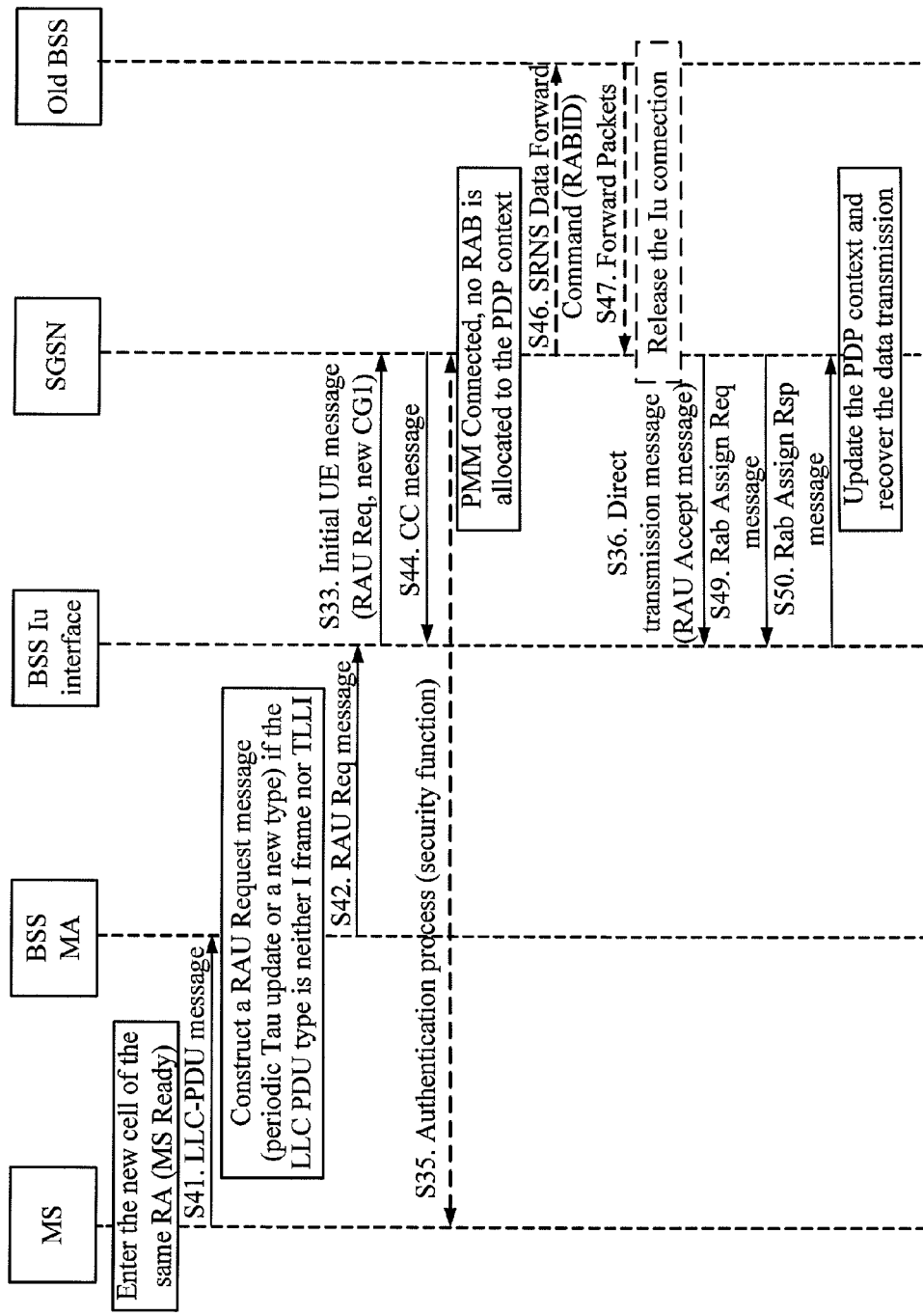

FIG. 7D is a flowchart of a message processing method of a cell update process in the network system shown in FIG. 6, where the dotted line indicates optional steps. The cell update process shown in FIG. 7D uses an RAU Req and is performed inside the SGSN when the PDP context is activated and a service is underway.

Step S41: The MS of the GPRS (EDGE) enters the new cell of the same Routing Area (RA), and sends an LLC-PDU message to the new BSS. The GMM state of the MS changes to READY.

Step S42: The MA of the BSS receives the LLC-PDU message, and constructs an RAU Req message (because the RA remains unchanged, "TYPE" needs to be set to "periodic RA update") according to the LLC-PDU type, and forwards the RAU Req message to the Iu interface.

Step S43: The Iu interface of the BSS constructs an RANAP Initial UE message that carries an RAU Req and a new CGI, and sends the Initial UE message to the SGSN.

Step S44: After receiving the CR message that carries the Initial UE message, the SGSN returns a CC message to the BSS through the Iu interface of the BSS, and sets up an Iu connection.

Step S45: The SGSN initiates a security function process.

Step S46: The SGSN determines that the PMM state is CONNECTED, that the PDP context is activated and that a RAB is already allocated. Therefore, the SGSN sends a Serving Radio Network Subsystem (SRNS) Data Forward Command that carries a RAB ID to the old BSS, and requests data from the old BSS.

Step S47: The old BSS sends a forward packet to the SGSN, and then the SGSN releases the Iu connection with the old BSS.

Step S48: The SGSN returns an RAU Accept message to the Iu interface of the BSS through a direct transfer message.

Step S49: The SGSN initiates RAB assignment (here the PMM may need to be changed for the GPRS user), and sends a Rab Assign Req message to the Iu interface of the BSS.

Step S50: The Iu interface of the BSS returns a Rab Assign Rsp message to the SGSN. The SGSN updates the PDP context, and notifies the GTPU to resume data transmission.

Figure 7E:
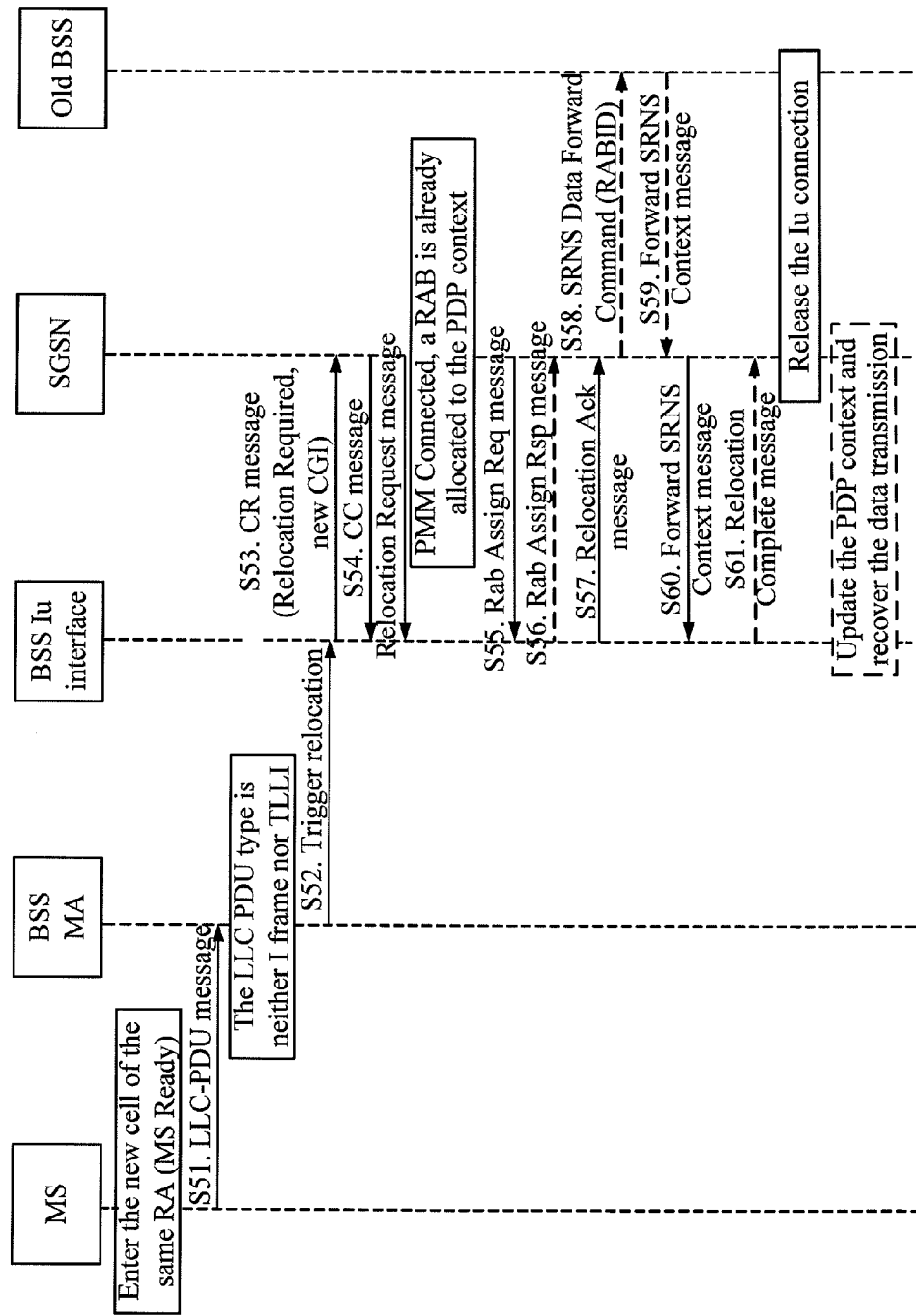

FIG. 7E is a flowchart of a message processing method of a cell update process in the network system shown in FIG. 6, where the dotted line indicates optional steps. The cell update process shown in FIG. 7E is a RANAP relocation process.

Step S51: The MS of the GPRS (EDGE) enters the new cell of the same RA, and sends an LLC-PDU message to the new BSS. The GMM state of the MS changes to READY.

Step S52: The MA of the new BSS receives an LLC-PDU message, triggers relocation according to the LLC-PDU type, constructs a Relocation Required message, and forwards it to the Iu interface of the BSS.

Step S53: The Iu interface of the BSS constructs a CR message that carries a Relocation Required message and a new CGI, and sends the CR message to the SGSN. The Relocation Required message in the protocol is sent by the old BSS; in this step, the Relocation Required message is sent by the new BSS. Therefore, the 3G SGSN needs to be changed accordingly.

Step S54: After receiving the CR message, the SGSN returns a CC message to the BSS through the Iu interface of the BSS, sets up an Iu connection, and sends a Relocation Request message.

Step S55: The SGSN determines that the PMM state is CONNECTED. If the PDP context is not activated, the SGSN releases the Iu connection with the new BSS; if the PDP context is activated and a RAB is already allocated, the SGSN sets up a RAB on the new BSS, initiates RAB assignment, and sends a Rab Assign Req message to the Iu interface of the BSS and proceeds with the following steps.

Step S56: The Iu interface of the BSS returns a Rab Assign Rsp message to the SGSN.

Step S57: The Iu interface of the BSS returns a Relocation Ack message to the SGSN.

Step S58: The SGSN sends an SRNS Data Forward Command that carries a RAB ID to the old BSS to request data from the old BSS.

Step S59: The old BSS sends a Forward SRNS Context message to the SGSN.

Step S60: The SGSN receives the Forward SRNS Context message sent by the old BSS, and forwards the message to the Iu interface of the BSS.

Step S61: The Iu interface of the BSS returns a Relocation Complete message, and the SGSN releases the Iu connection with the old BSS. The SGSN updates the PDP context and resumes the data transmission.

Figure 7F:
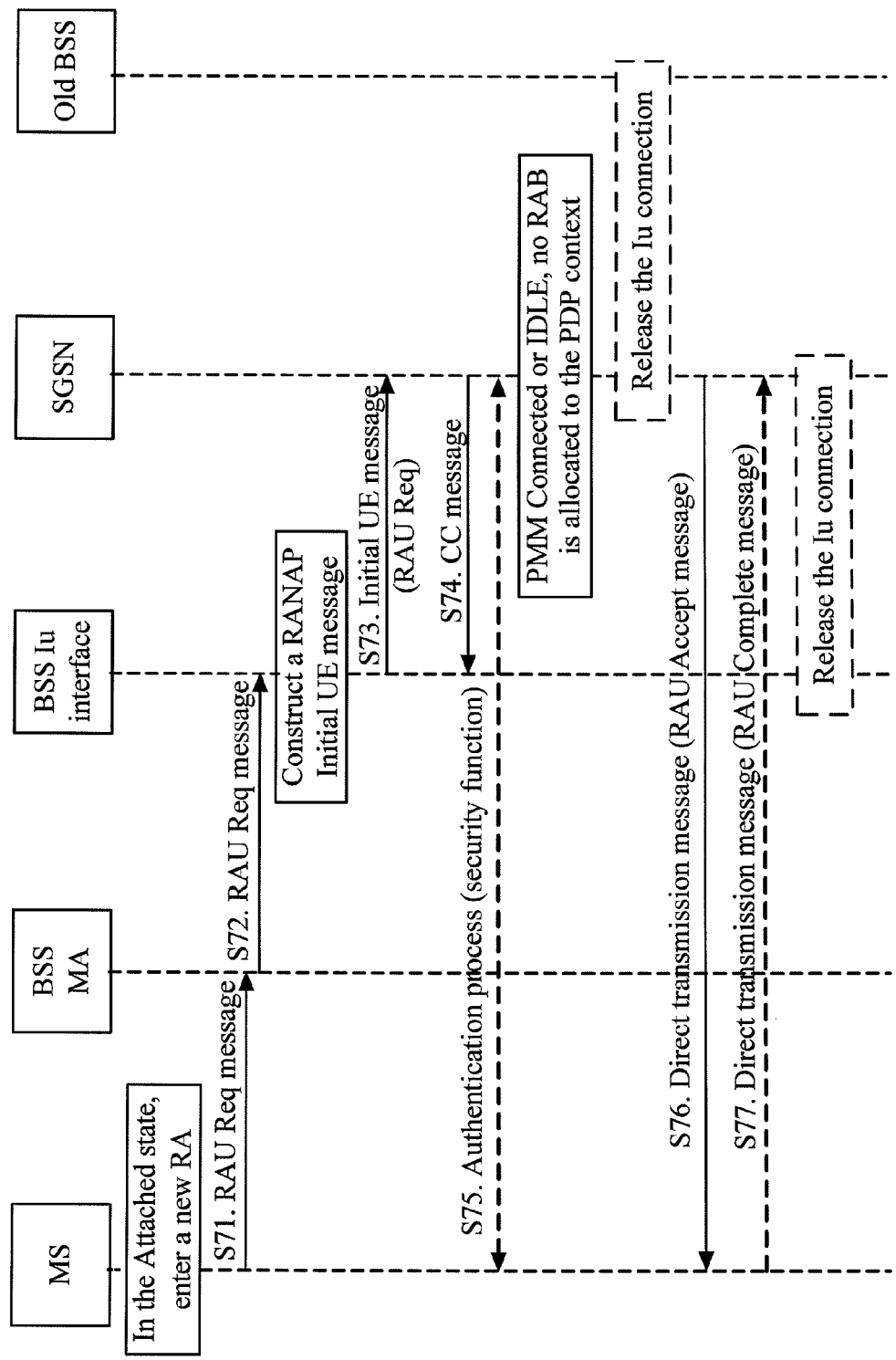

FIG. 7F is a flowchart of a message processing method of a RA/location area update process in the network system shown in FIG. 6, where the dotted line indicates optional steps. The RA/location area update process shown in FIG. 7F is performed inside the SGSN when the PDP context is not activated and no service is underway.

Step S71: After getting attached (namely, in the ATTACHED state), the MS of the GPRS (EDGE) enters a new RA, and sends an RAU Req message to the new BSS. The GMM state of the MS changes to READY.

Step S72: The MA of the BSS receives the RAU Req message, and forwards the message to the Iu interface.

Step S73: The Iu interface of the BSS constructs a RANAP Initial UE message that carries an RAU Req, and sends the Initial UE message to the SGSN.

Step S74: After receiving the CR message that carries the Initial UE message, the SGSN returns a CC message to the BSS through the Iu interface of the BSS, and sets up an Iu connection.

Step S75: The SGSN initiates a security function process.

Step S76: The SGSN determines that the PMM state is CONNECTED or IDLE, that the PDP context is not activated, and that no RAB is allocated. Therefore, the SGSN releases the Iu connection with the old BSS. Afterward, the SGSN returns an RAU Accept message to the MA of the BSS through a direct transfer message.

Step S77: The MS returns an RAU Complete message to the SGSN through a direct transfer message. After receiving the RAU Complete message, the SGSN releases the Iu connection.

Figure 7G:
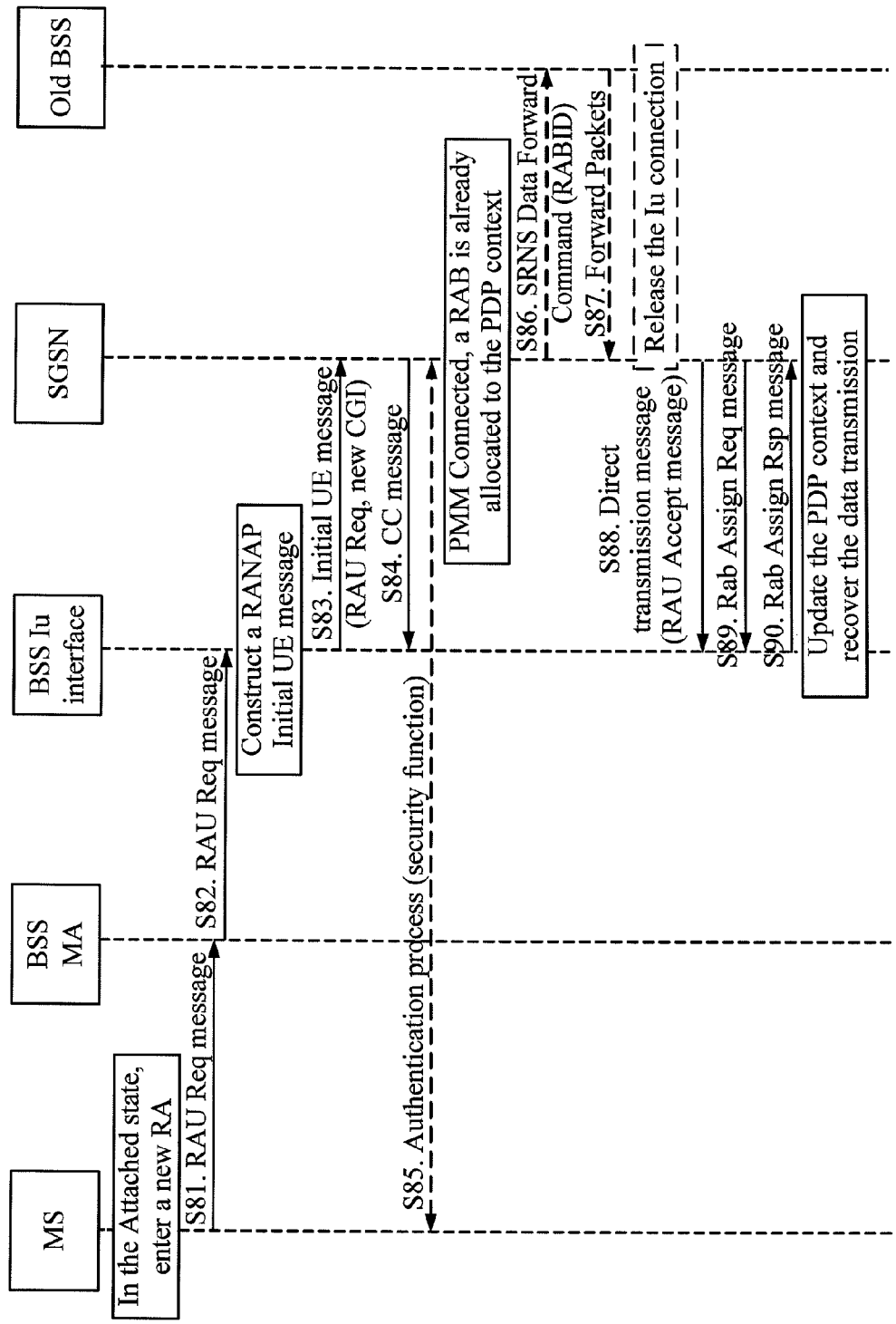

FIG. 7G is a flowchart of a message processing method of a RA/location area update process in the network system shown in FIG. 6, where the dotted line indicates optional steps. The RA/location area update process shown in FIG. 7G is performed inside the SGSN when the PDP context is activated and a service is underway.

Step S81: After getting attached (namely, in the ATTACHED state), the MS of the GPRS (EDGE) enters a new RA, and sends an RAU Req message to the new BSS. The GMM state of the MS changes to READY.

Step S82: The MA of the BSS receives the RAU Req message, and forwards the message to the Iu interface.

Step S83: The Iu interface of the BSS constructs a RANAP Initial UE message that carries an RAU Req, and sends the Initial UE message to the SGSN.

Step S84: After receiving the CR message that carries the Initial UE message, the SGSN returns a CC message to the BSS through the Iu interface of the BSS, and sets up an Iu connection.

Step S85: The SGSN initiates a security function process.

Step S86: The SGSN determines that the PMM state of the SGSN is CONNECTED, that the PDP context is activated, and that a RAB is already allocated. Therefore, the SGSN sends an SRNS Data Forward Command that carries a RAB ID to the old BSS to request data from the old BSS.

Step S87: The old BSS sends a forward packet to the SGSN, and then the SGSN releases the Iu connection with the old BSS.

Step S88: The SGSN returns an RAU Accept message to the Iu interface of the BSS through a direct transfer message.

Step S89: The SGSN initiates RAB assignment, namely, sends a Rab Assign Req message to the Iu interface of the BSS.

Step S90: The Iu interface of the BSS returns a Rab Assign Rsp message to the SGSN. The SGSN updates the PDP context, and notifies the GTPU to resume data transmission.

Figure 7H:
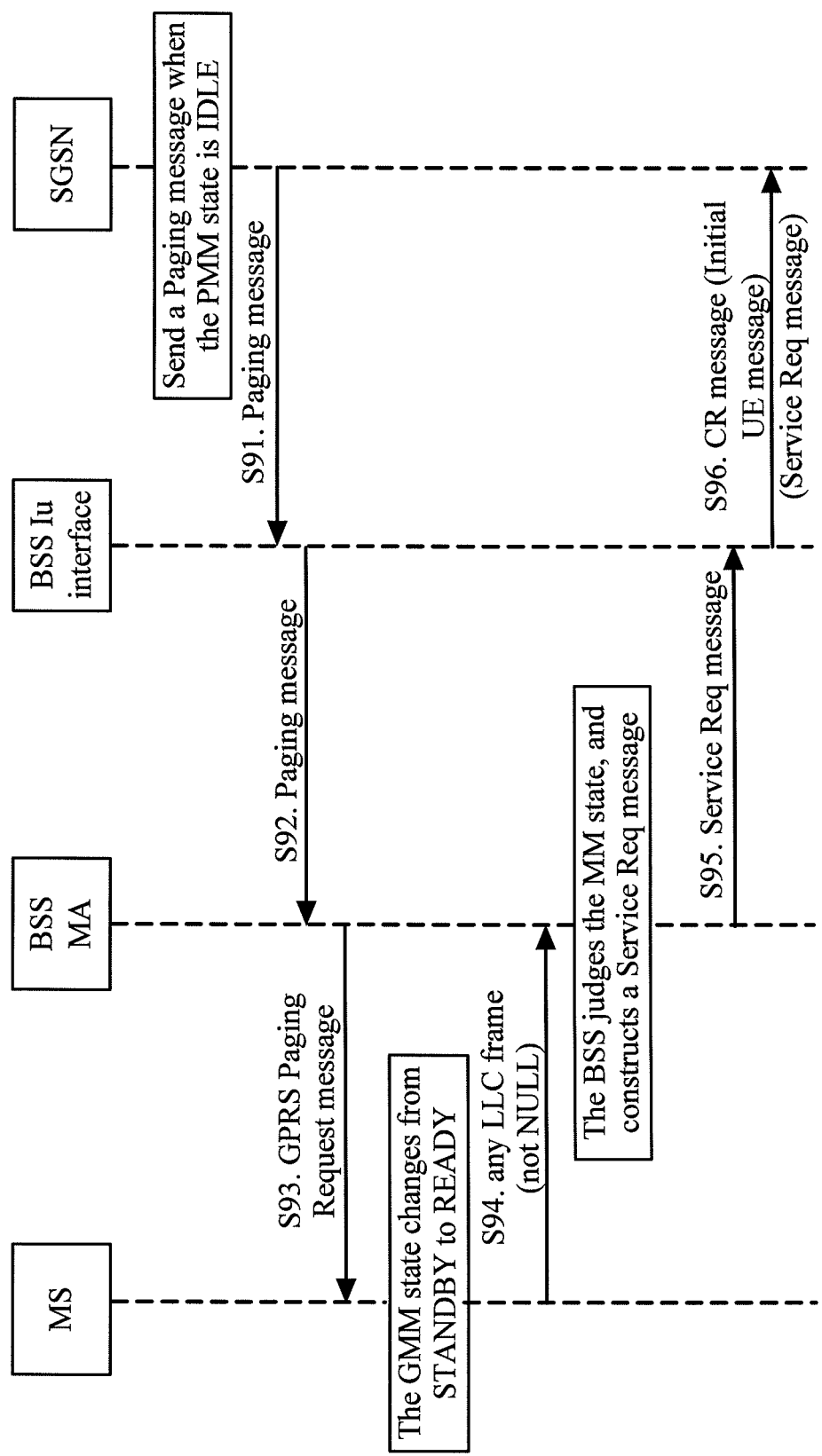

FIG. 7H is a flowchart of a message processing method of a paging process in the network system shown in FIG. 6.

Step S91: When the 3G SGSN needs to send downlink data, the PMM state is IDLE, and the SGSN sends a Paging message to the Iu interface of the BSS.

Step S92: The Iu interface of the BSS forwards the Paging message to the MA of the BSS.

Step S93: After receiving the Paging message, the MA of the BSS constructs a GPRS Paging Request message, and sends the message to the MS of the GPRS.

Step S94: After the MS receives the GPRS Paging Request message, the GMM state changes from STANDBY to READY, and the MS returns a non-NULL LLC frame as a paging response to the MA of the BSS.

Step S95: After receiving the LLC frame, the MA of the BSS judges the MM state, constructs a Service Req message, initiates a service request process, and sends the Service Req message to the Iu interface of the BSS.

Step S96: The Iu interface of the BSS constructs an Initial UE message that carries the Service Req, and sends the Initial UE message to the SGSN to request a connection.

Figure 7I:
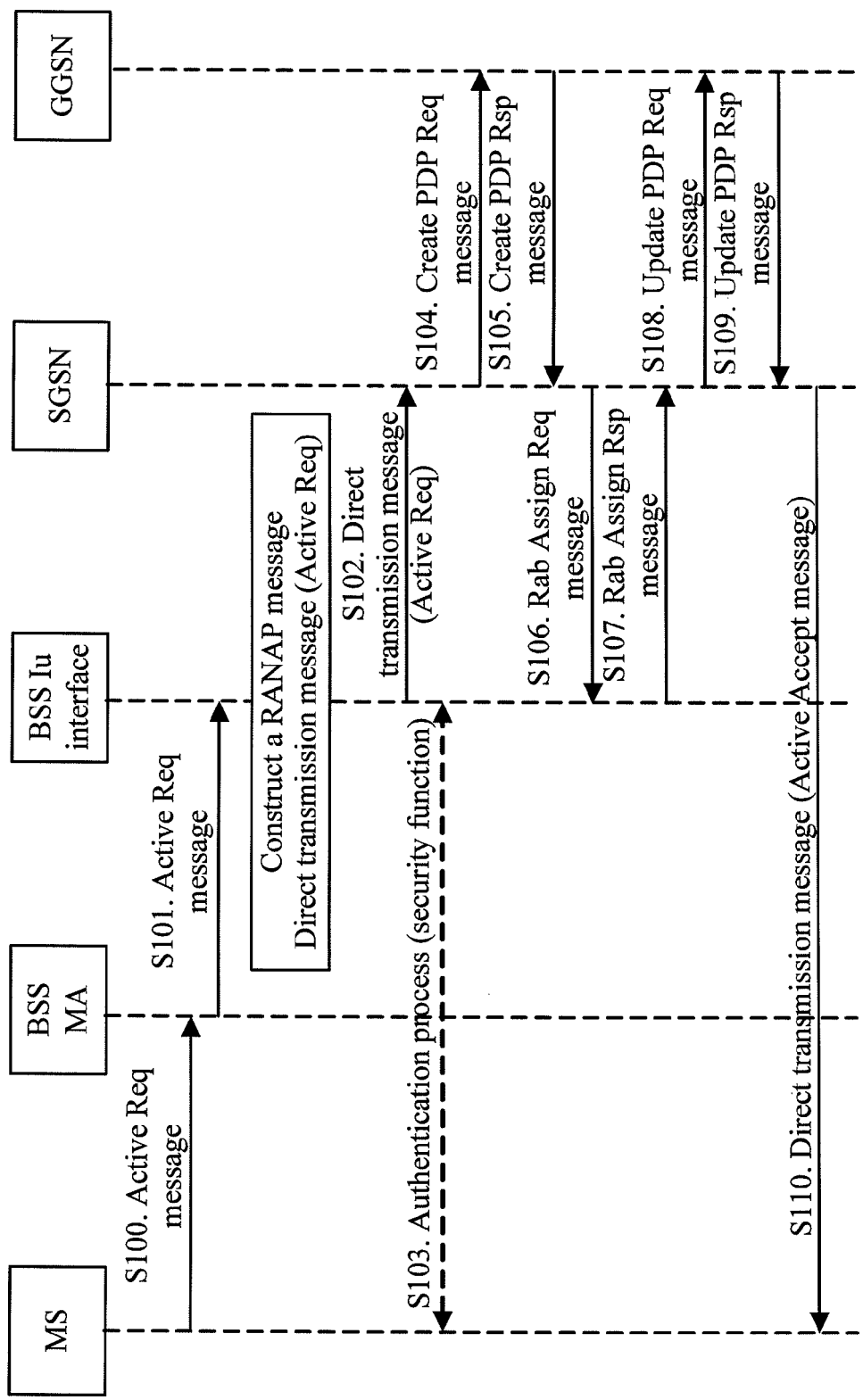

FIG. 7I is a flowchart of a message processing method of PDP context activation (initiated by the MS) in the network system shown in FIG. 6, where the dotted line indicates optional steps.

Step S100: After getting attached, the MS of the GPRS (EDGE) sends an LLC-PDU message that carries an Active Req message to the BSS.

Step S101: The MA of the BSS performs adaptation for the LLC_PDU message, and forwards the Active Req message to the Iu interface of the BSS.

Step S102: The Iu interface of the BSS constructs an RANAP direct transfer message that carries an Active Req, and sends the message to the SGSN.

Step S103: The SGSN initiates a security function process.

Step S104: The SGSN sends a Create PDP Req message to the GGSN, requesting to create a PDP context.

Step S105: The GGSN returns a Create PDP Rsp message to the SGSN.

Step S106: The SGSN initiates RAB assignment, and sends a Rab Assign Req message to the Iu interface of the BSS.

Step S107: The Iu interface of the BSS returns a Rab Assign Rsp message to the SGSN.

Step S108: After the RAB is set up, the SGSN sends an Update PDP Req message to the GGSN, notifying the GGSN to update the PDP context.

Step S109: The GGSN returns an Update PDP Rsp message to the SGSN.

Step S110: The SGSN sends an Active Accept message to the MS through a direct transfer message.

The following table outlines the service process adaptation method of the MA, and the change of the GMM state of the GPRS (EDGE) MS and the PMM state of the 3G SGSN:

| GPRS (EDGE) + Iu PS | GPRS (EDGE) MS | BSS (MA Adaptation) | 3G SGSN |
|---|---|---|---|
| GMM/PMM state meaning | The GMM state meaning is adjusted to the Iu mode. | — | The PMM state meaning is the same as that of the Iu mode. |
| IDLE→READY state transition | An ATTACH REQ message is sent. | The BSS receives a NAS message, triggers the RANAP initial direct transmission process, and sets up an Iu signaling connection. | PMM DETACHED →PMM CONNECTED |
| READY →STANDBY state transition | Timer-Ready expiry | When the MS enters the READY state, the BSS starts the timer (whose duration is the same as the Timer-Ready). After expiry of the timer, the BSS triggers the Iu connection release request. | The Iu release request from the BSS is processed, and the Iu is released. PMM CONNECTED →PMM IDLE |
| STANDBY →READY state transition | In the STANDBY state, the MS sends an LLC frame. | The BSS receives the LLC frame, judges the LLC frame type (user data, LLC control frame, signaling, and so on); if no Iu connection exists, the BSS triggers the RANAP initial direct transmission; otherwise, the BSS sends a direct transfer message. | For initial direct transmission, the state transition is from PMM IDLE to PMM CONNECTED; for direct transition, the PMM CONNECTED state remains unchanged. |
| In the READY state, cell reselection occurs. | The MS sends an LLC frame in the new cell. | After receiving the LLC frame, the new BSS constructs an RAU Req message, triggers RANAP initial direct transmission; or triggers a RANAP relocation process. | After the PDP context state is determined as ACTIVE, RAB assignment is initiated to the new BSS, and an RAU Accept message is returned after completion of the assignment; or a relocation process is initiated; the PMM CONNECTED state remains unchanged. |
| In the READY state, RAU occurs. | The MS sends an RAU Req message. | After receiving the RAU Req, the new BSS triggers the RANAP initial direct transmission process, and sets up an Iu connection. | After the PDP context state is determined as ACTIVE, RAB assignment is initiated to the new BSS, and an RAU Accept message is returned after completion of the assignment; the PMM CONNECTED state remains unchanged. |

The "GPRS (EDGE)+Iu PS interface" network system shown in FIG. 6 performs adaptation for the MS and the BSS in the 2G system and the CN in the 3G system through an MA of the BSS, and provides a technical solution to evolution from the 2G network to the 3G network. This embodiment has the following merits:

The structures of the access network and the CN are improved on the basis of retaining the GPRS (EDGE) air interface, and the 3G services are provided on the basis of the EDGE. In this way, the MS of the GPRS (EDGE) is backward compatible; the existing investment is protected significantly; and the solution is applicable to the network evolution in the case that no 3G spectrum license is obtained.

The Iu PS interface replaces the Gb interface, and the CN is shared with the 3G system, thus improving the network performance, eliminating the drawbacks of the Gb interface and enhancing the evolution capabilities.

In the network upgrade, the Iu PS interface is basically compliant with standards (the CN may need to be changed for a certain process, but the change is slight), and the capabilities of interworking and compatibility between systems are improved.

By using an MA, the solution involves little change of the existing GPRS (EDGE) network, and is easy to implement.

Figure 8:
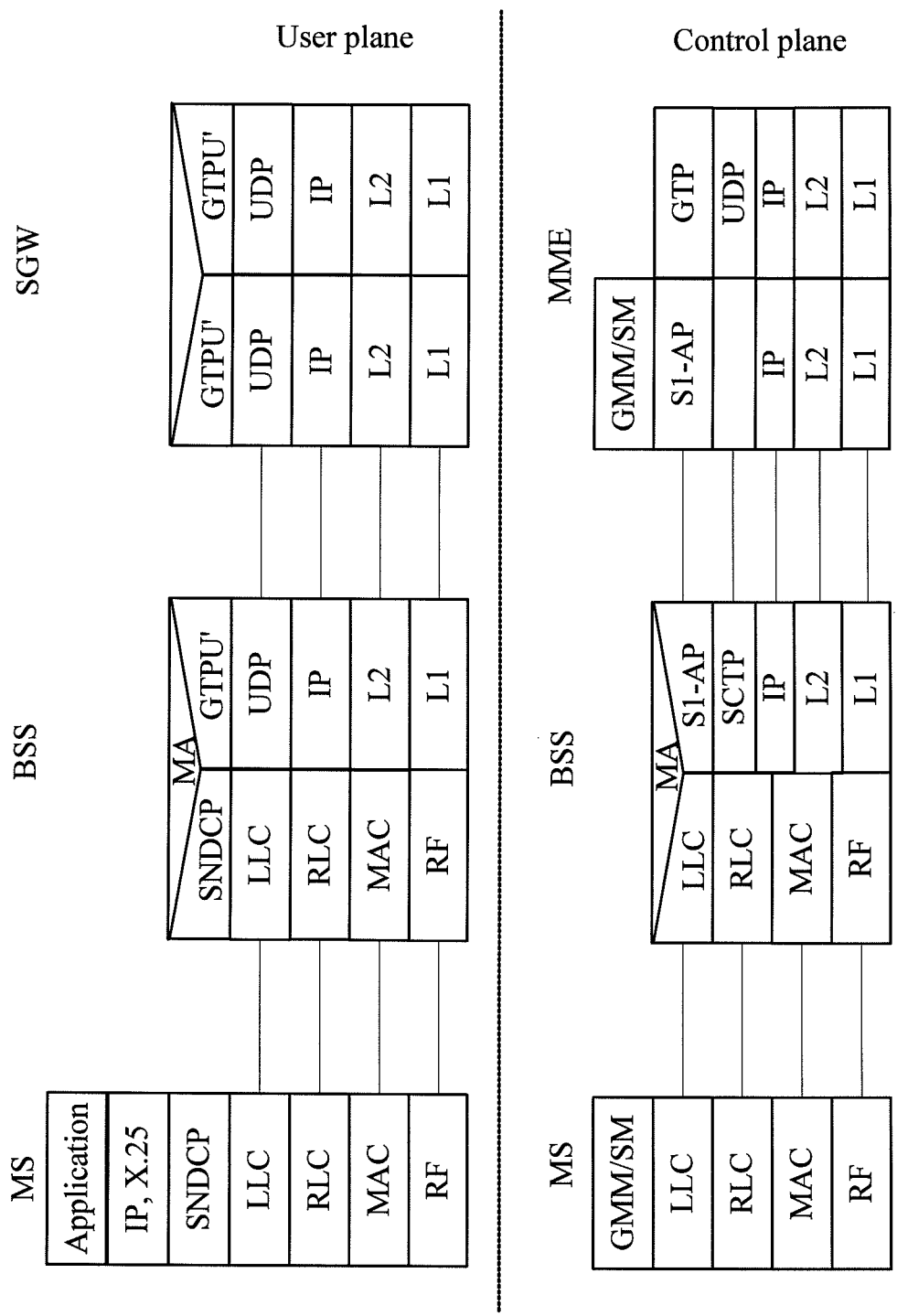
FIG. 8 shows a protocol stack structure of a "GPRS (EDGE)+S1 interface" network system in an embodiment of the disclosure.

FIG. 8 shows a protocol stack structure of a "GPRS (EDGE)+S1 interface" network system in an embodiment of the disclosure; that is, the old network is a GPRS (EDGE) and the CN in the new network is an LTE CN. The CN interface is an S1 interface in place of the Gb interface. In the BSS, an MA is applied to make the MS and the BSS in the 2G network adaptable to the CN in the LTE network.

The MA in this embodiment includes a control-plane MA and a user-plane MA. The control-plane MA is connected to the access layer of the air interface control-plane protocol stack for the GPRS (EDGE) and the access layer of the S1 interface control-plane protocol stack for the LTE network and configured to adapt and forward the signaling messages sent by the MS of the GPRS (EDGE) and the CN of the UMTS; the user-plane MA is connected to the access layer of the air interface user-plane protocol stack for the GPRS (EDGE) and the access layer of the S1 interface user-plane protocol stack for the LTE network and configured to adapt and forward the data sent by the MS of the GPRS (EDGE) and the CN of the LTE network.

The BSS of the GPRS (EDGE) is directly connected to the Mobility Management Entity (MME) and the Serving Gateway (SGW) of the LTE network through an S1 interface. The SNDCP and the LLC protocol of the Gb interface are related to the air interface. Therefore, the SNDCP and the LLC protocol are shifted from the SGSN down to the BSS, and other protocols of the Gb interface are replaced by the protocol of the S1 interface. On the control plane, the S1-AP of the S1 interface replaces the signaling management function of the BSSGP of the Gb interface, and the transport layer uses the SCTP as a signaling bearer. On the user plane, the GTPU' protocol undertakes the functions of the old user plane of the Gb interface.

On the control plane, the MA is located above the LLC protocol and the S1-AP protocol of the BSS protocol stack; on the user plane, the MA is located above the SNDCP and the GTPU'. The MA adapts the signaling process and the user-plane data transmission respectively, including: mobility and handover adaptation, NAS signaling adaptation, signaling forwarding between the LLC protocol and the S1-AP, QoS parameter mapping between the LTE system and the GPRS, security authentication, user-plane addressing and mapping.

The control-plane MA in this embodiment includes a mobility management adapting unit, a session management adapting unit, and a signaling forwarding unit.

The mobility management adapting unit performs adaptation for the mobility process in the following way:

(1) The MA is located between the LLC protocol and the S1-AP, and the MA adaptation keeps consistency of the MM state between the MME and the MS. The MS performs the GMM state process of the GPRS, and the MME performs the MM state process of the S1 interface.

(2) In the process of attach, cell update, Routing Area (RA)/location area update, and paging, the MA triggers or controls the S1-AP process to perform adaptation, and may construct a NAS message when necessary.

(3) The MA performs parameter conversion for the messages on the NAS or S1-AP layer, for example, security authentication parameters and QoS parameters.

The session management adapting unit adapts the session process in this way: After the S1 interface replaces the Gb interface, in the session process, the user-plane bearer (including GTPU tunnel and air interface resources) is set up/released through an S1-AP session management process.

The signaling forwarding unit reciprocally forwards the signaling message of the LLC layer of the air interface control-plane protocol stack for the GPRS (EDGE) and the S1-AP layer of the S1 interface control-plane protocol stack for the LTE network.

The user-plane MA in this embodiment includes an identity mapping unit and a data forwarding unit. The identity mapping unit performs adaptation for the user-plane data transmission in this way: After the SNDCP and the LLC protocol are shifted down to the BSS, the maintenance of the TLLI is terminated at the BSS, and the MA needs to be responsible for mapping between the TLLI and the GTPU tunnel identity of the S1 interface. The data forwarding unit reciprocally forwards the data on the SNDCP layer of the air interface user-plane protocol stack for the GPRS (EDGE) and the GTPU' layer of the S1 interface user-plane protocol stack for the LTE system.

The following describes the service process of the "GPRS (EDGE)+S1 interface" network system with reference to FIG. 8, taking FIG. 9A to FIG. 9E as examples.

Figure 9A:
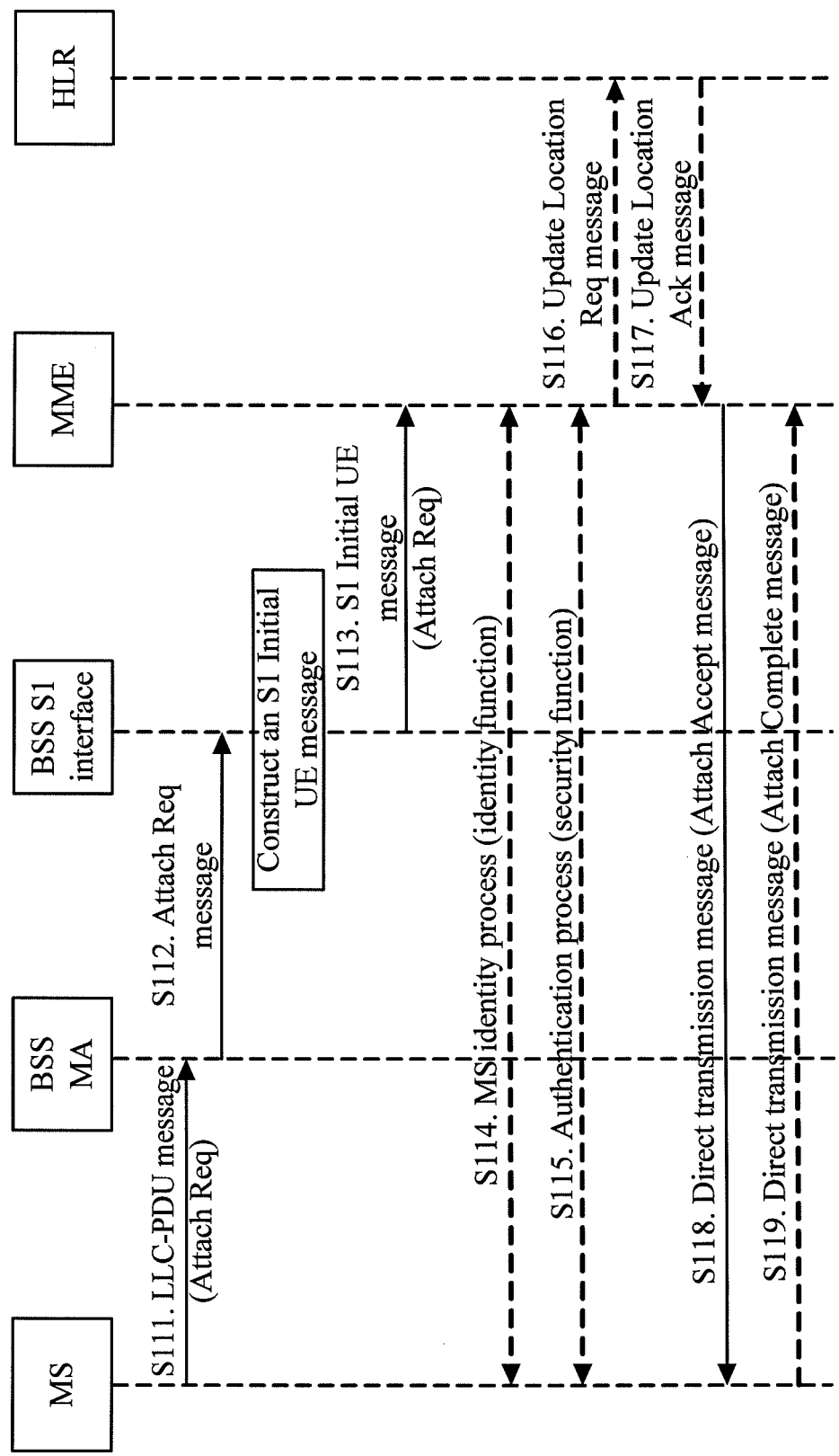
FIG. 9A to FIG. 9E are a flowchart of a message processing method in the service process of the network system shown in FIG. 8.

FIG. 9A is a flowchart of a message processing method of an attach process in the network system shown in FIG. 8, where the dotted line indicates optional steps.

Step S111: The MS of the GPRS (EDGE) initiates an attach process, and sends the LLC-PDU message that carries an Attach Req to the BSS.

Step S112: After receiving the LLC-PDU message, the MA of the BSS performs adaptation for the NAS message. The adaptation operations include: parsing the LLC-PDU message to obtain the Attach Req message, and performing parameter conversion between the GPRS (EDGE) and the LTE system for the Attach Req message. Afterward, the MA forwards the Attach Req message to the S1-AP, and constructs an S1 Initial UE message.

Step S113: The BSS initiates an Initial UE process, and sends an S1 Initial UE message that carries an Attach Req to the MME through the S1 interface of the BSS.

Step S114: The MME initiates an identity function process.

Step S115: The MME initiates a security function process.

Steps S116 and S117: The MME initiates a location update process. In step S116, the MME sends an Update Location Req message to the HLR; in step S117, the HLR returns an Update Location Ack message to the MME.

Step S118: The MME returns an Attach Accept message to the MS through a direct transfer message.

Step S119: If the TMSI is updated, the MS returns an Attach Complete message to the MME through a direct transfer message.

Figure 9B:
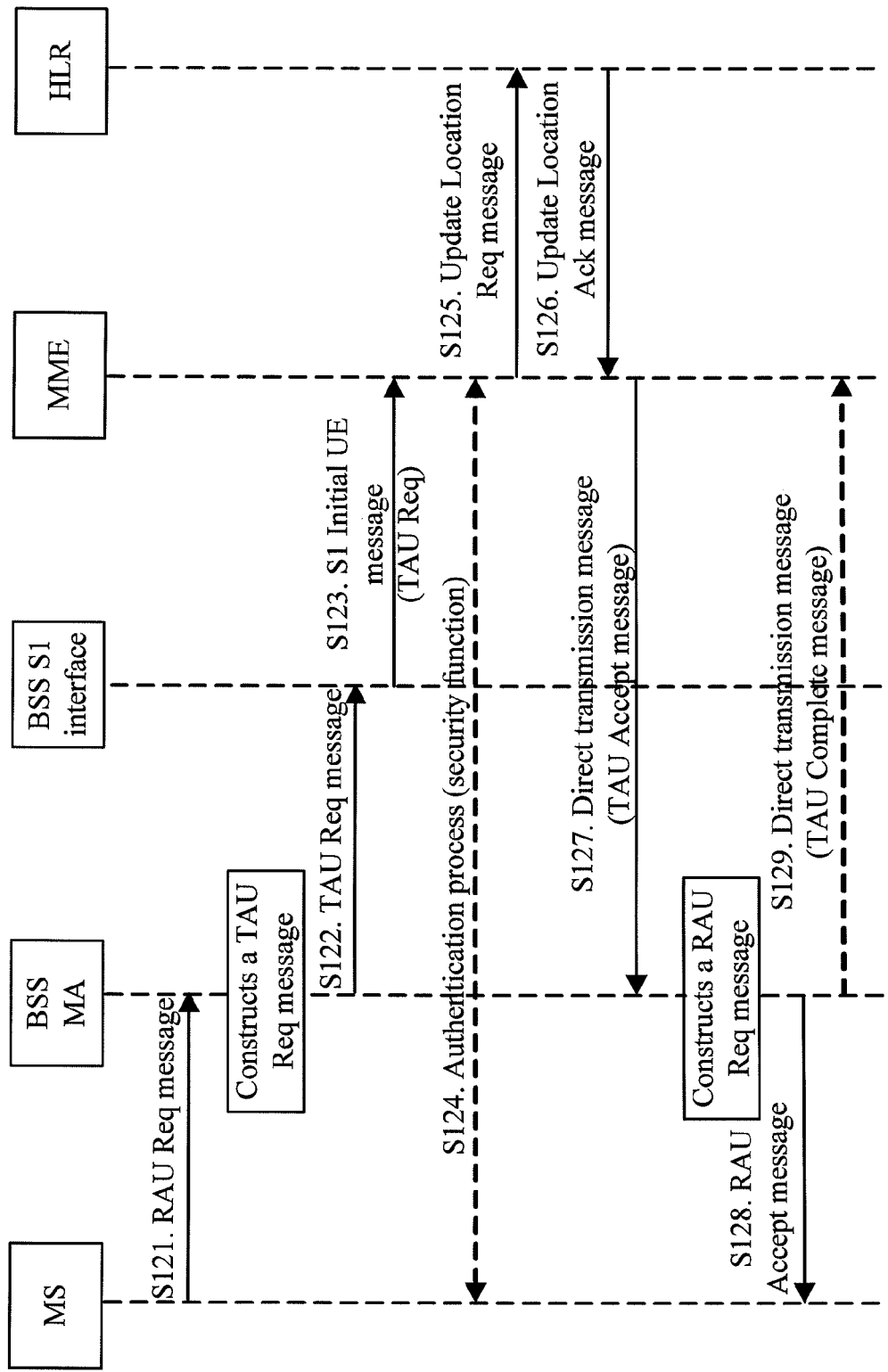

FIG. 9B is a flowchart of a message processing method of an RAU process in the network system shown in FIG. 8, where the dotted line indicates optional steps.

Step S121: After getting attached, the MS of the GPRS (EDGE) enters a new RA, and sends an RAU Req message to the new BSS. The GMM state of the MS changes to READY.

Step S122: The MA of the BSS receives an RAU Req message, constructs a Tracing Area Update (TAU) Req message, and sends the message to the S1 interface.

Step S123: The S1 interface of the BSS constructs an S1 Initial UE message that carries a TAU Req, and sends the S1 Initial UE message to the MME.

Step S124: The MME initiates a security function process.

Steps S125 and S126: The MME initiates a location update process. In step S125, the MME sends an Update Location Req message to the HLR; in step S126, the HLR returns an Update Location Ack message to the MME.

Step S127: The MME returns a TAU Accept message to the MA of the BSS through a direct transfer message.

Step S128: After receiving the TAU Accept message, the MA of the BSS constructs an RAU Accept message, and sends the message to the MS.

Step S129: If a TMSI is reallocated, the MA constructs a TAU Complete message, and returns the TAU Complete message to the MME through a direct transfer message.

Figure 9C:
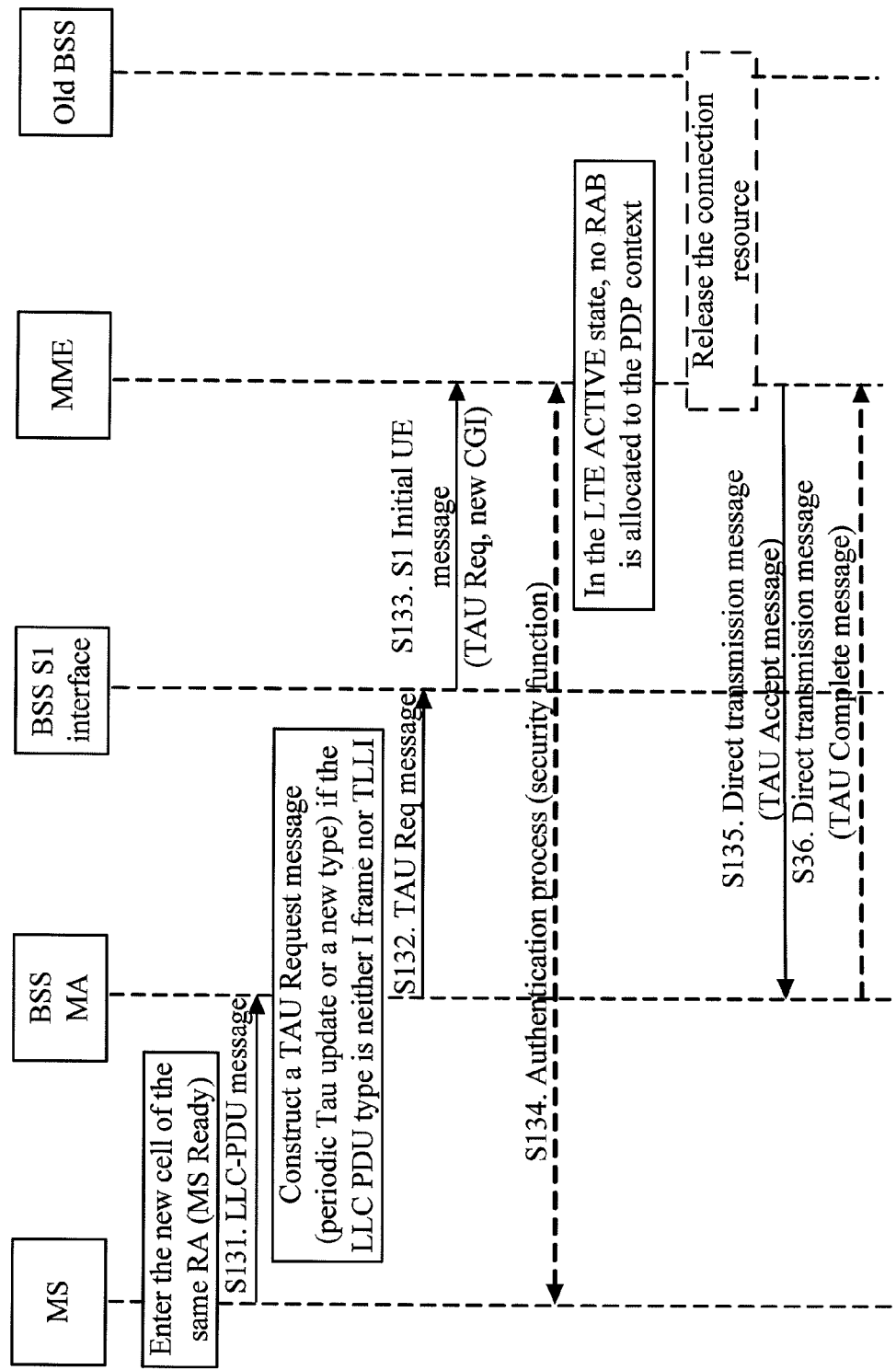

FIG. 9C is a flowchart of a message processing method of a cell update process in the network system shown in FIG. 8, where the dotted line indicates optional steps. The cell update process shown in FIG. 9C uses a TAU Req and is performed inside the MME when the PDP context is not activated and no service is underway.

Step S131: The MS of the GPRS (EDGE) enters the new cell of the same Routing Area (RA), and sends an LLC-PDU message to the new BSS. The GMM state of the MS changes to READY.

Step S132: The MA of the BSS receives the LLC-PDU message, and constructs a TAU Req message (because the RA remains unchanged, "TYPE" needs to be set to "periodic TA update") according to the LLC-PDU type, and sends the TAU Req message to the S1 interface.

Step S133: The S1 interface of the BSS constructs an S1 Initial UE message that carries a TAU Req and a new CGI, and sends the S1 Initial UE message to the MME.

Step S134: The MME initiates a security function process.

Step S135: The MME determines that the MM state is LTE ACTIVE, but no RAB is allocated to the PDP context. Therefore, the MME releases the connection with the old BSS. Afterward, the MME returns a TAU Accept message to the MA of the BSS through a direct transfer message.

Step S136: If a TMSI is reallocated, the MA constructs and returns a direct transfer message (namely, a TAU Complete message) to the MME.

Figure 9D:
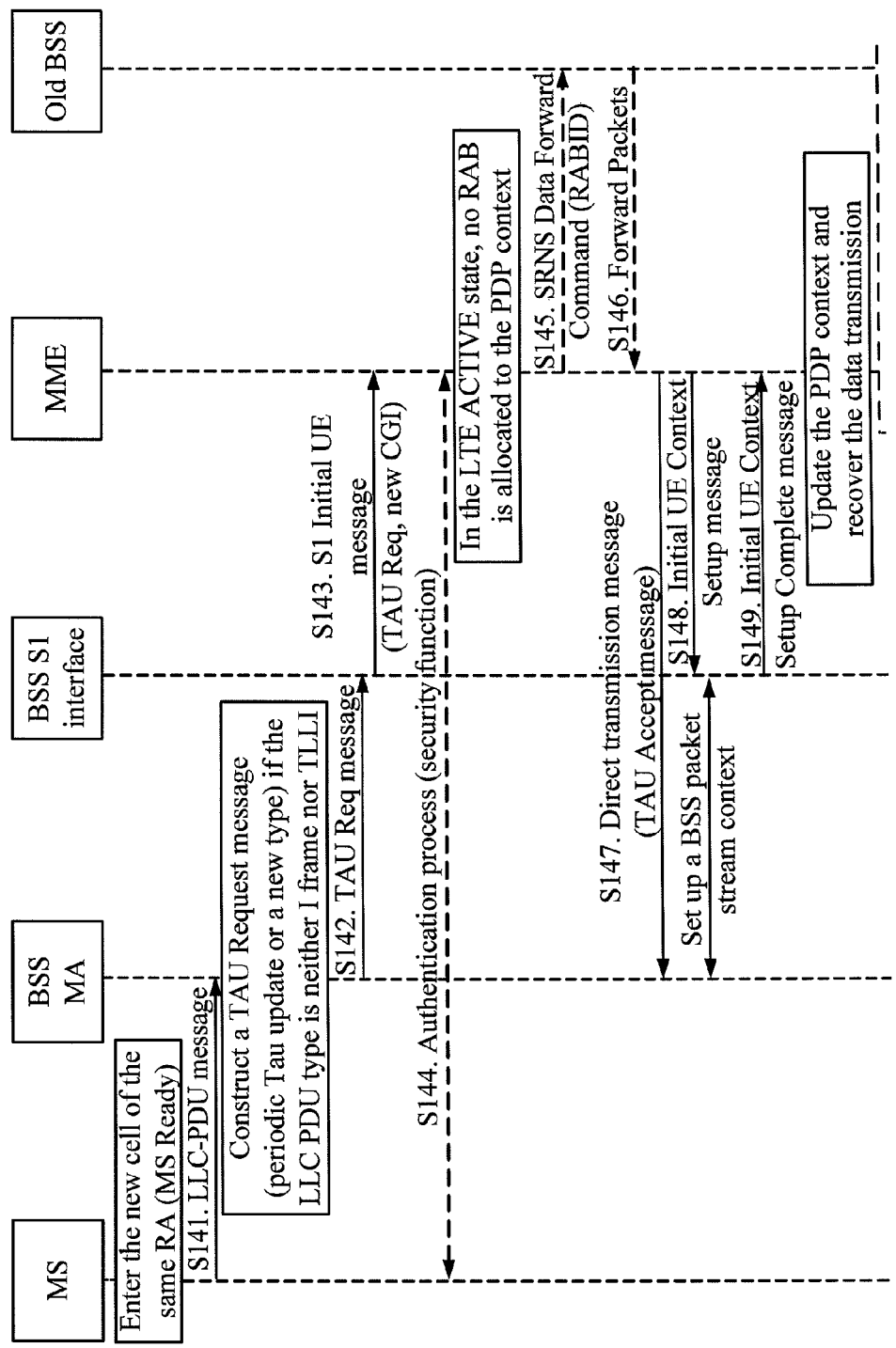

FIG. 9D is a flowchart of a message processing method of a cell update process in the network system shown in FIG. 8, where the dotted line indicates optional steps. The cell update process shown in FIG. 9D uses a TAU Req message and is performed inside the MME when the PDP context is activated and a service is underway.

Step S141: The MS of the GPRS (EDGE) enters the new cell of the same Routing Area (RA), and sends an LLC-PDU message to the new BSS. The GMM state of the MS changes to READY.

Step S142: The MA of the BSS receives the LLC-PDU message, and constructs a TAU Req message (because the RA remains unchanged, "TYPE" needs to be set to "periodic TA update") according to the LLC-PDU type, and sends the TAU Req message to the S1 interface.

Step S143: The S1 interface of the BSS constructs an S1 Initial UE message that carries a TAU Req and a new CGI, and sends the S1 Initial UE message to the MME.

Step S144: The MME initiates a security function process.

Step S145: The MME determines that its MM state is LTE ACTIVE, and that a RAB is already allocated to the PDP context. Therefore, the MME sends an SRNS Data Forward Command that carries a RAB ID to the old BSS to request data from the old BSS.

Step S146: The old BSS sends a forward packet to the MME.

Step S147: The MME returns a TAU Accept message to the MA of the BSS through a direct transfer message.

Step S148: The MME initiates an initial context setup process (here the MME may need to be changed for the GPRS user), and sends an Initial UE Context Setup message to the S1 interface of the BSS, and the BSS sets up a BSS packet stream context (bearer setup process).

Step S149: After completion of setting up the BSS packet stream context, the BSS sends an Initial UE Context Setup Complete message to the MME. The MME updates the PDP context, and notifies the GTPU to resume data transmission, and then releases the connection with the old BSS.

Figure 9E:
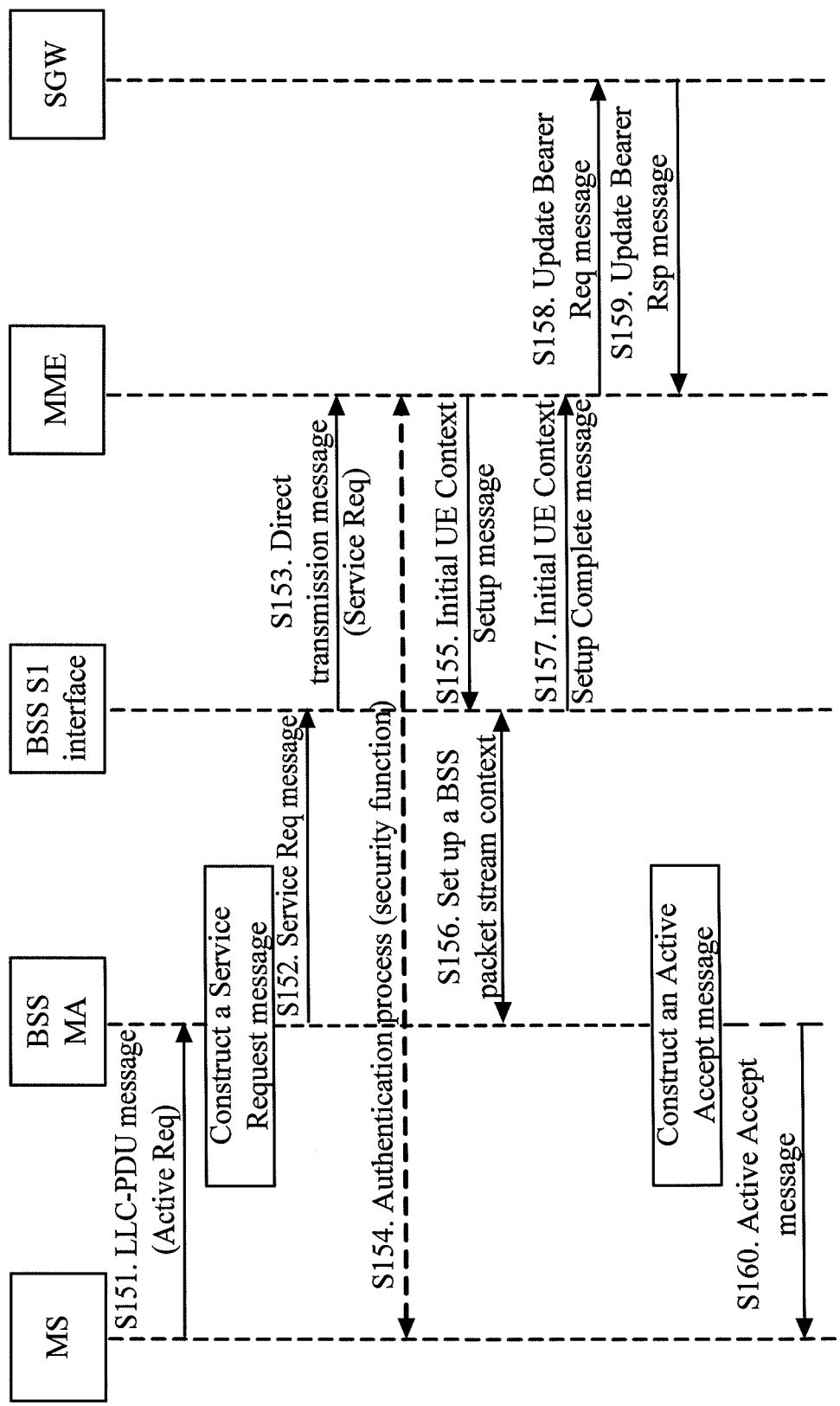

FIG. 9E is a flowchart of a message processing method of a session management process (PDP activation initiated by the MS) in the network system shown in FIG. 8, where the dotted line indicates optional steps.

Step S151: After getting attached, the MS of the GPRS (EDGE) sends an LLC-PDU message that carries an Active Req message to the BSS.

Step S152: The MA of the BSS constructs a Service Request message, and sends the message to the S1 interface of the BSS.

Step S153: The S1 interface of the BSS constructs a Service Req message, and sends the message to the MME through a direct transfer message.

Step S154: The MME initiates a security function process.

Step S155: The MME initiates an initial context setup process, and sends an Initial UE Context Setup message to the S1 interface of the BSS.

Step S156: A BSS packet stream context is set up (bearer setup process).

Step S157: The BSS sends an Initial UE Context Setup Complete message to the MME.

Step S158: The MME sends an Update Bearer Req message to the SGW.

Step S159: After the bearer is updated, the SGW returns an Update Bearer Rsp message.

Step S160: The MA of the BSS constructs a NAS message, namely, an Active Accept message, and returns the message to the MS.

The "GPRS (EDGE)+S1 interface" network system shown in FIG. 8 performs adaptation for the MS and the BSS in the 2G system and the CN in the LTE system through an MA of the BSS, and provides a practicable solution to evolution from the 2G network to the NGN. This embodiment has the following merits:

The structures of the access network and the CN are improved on the basis of retaining the GPRS (EDGE) air interface, and the LTE services are provided on the basis of the EDGE. In this way, the MS of the GPRS (EDGE) is backward compatible, and the existing investment is protected significantly.

The S1 interface replaces the Gb interface, and the CN is shared with the LTE system, thus improving the network performance, eliminating the drawbacks of the Gb interface and enhancing the evolution capabilities.

By using an MA, the solution involves little change of the existing GPRS (EDGE) network, and is easy to implement.

Figure 10:
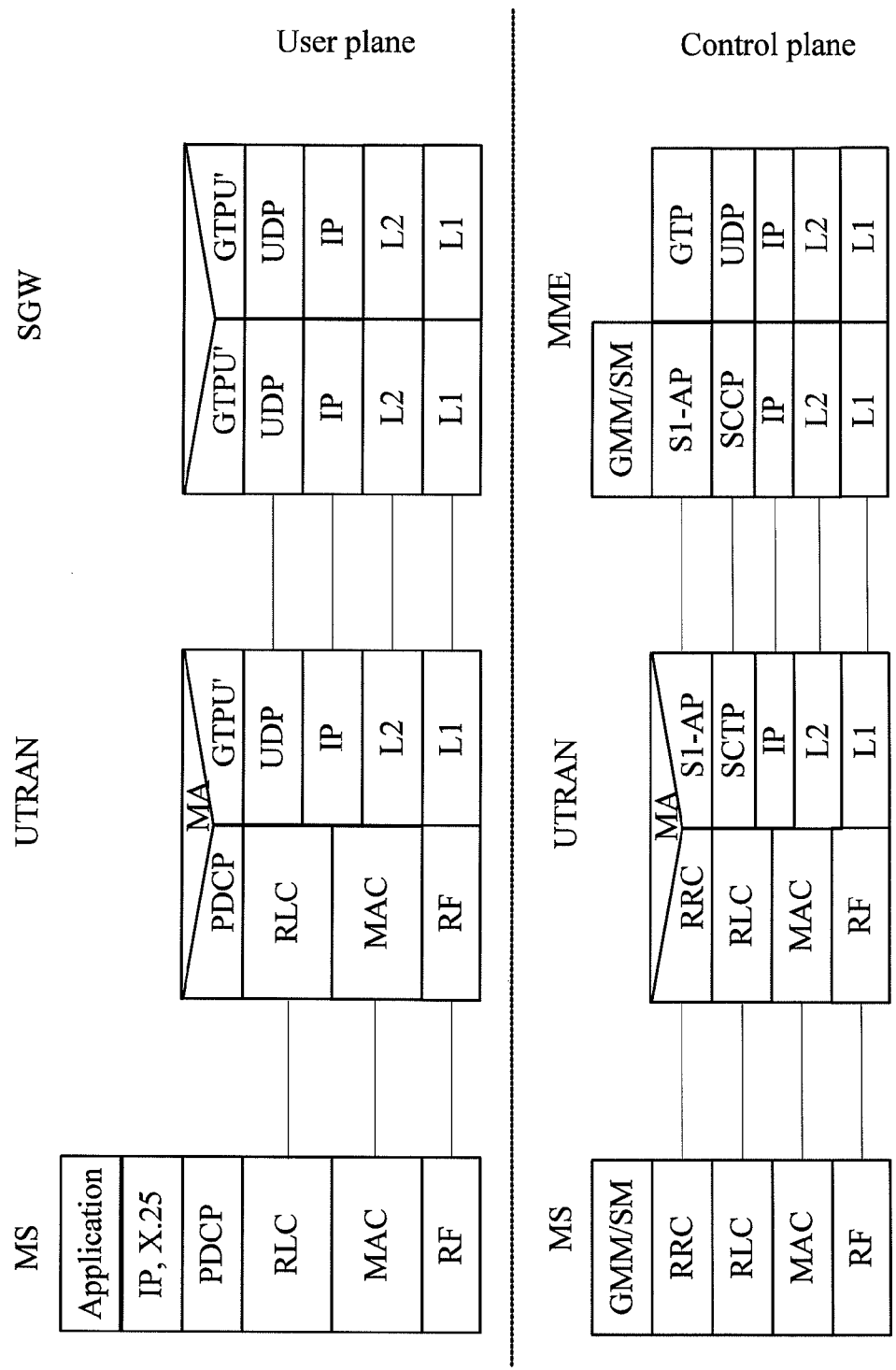
FIG. 10 shows a protocol stack structure of a "UMTS+S1 interface" network system in an embodiment of the disclosure.

FIG. 10 shows a protocol stack structure of a "UMTS+S1 interface" network system in an embodiment of the disclosure; that is, the old network is a UMTS and the CN in the new network is an LTE CN. The CN interface is an S1 interface in place of the Iu PS interface. In the UTRAN, an MA is applied to make the MS and the UTRAN in the 3G network adaptable to the CN in the LTE network.

The MA in this embodiment includes a control-plane MA and a user-plane MA. The control-plane MA is connected to the access layer of the air interface control-plane protocol stack for the UMTS and the access layer of the S1 interface control-plane protocol stack for the LTE system and configured to adapt and forward the signaling messages sent by the MS of the LTE and the CN of the UMTS; the user-plane MA is connected to the access layer of the air interface user-plane protocol stack for the UMTS and the access layer of the S1 interface user-plane protocol stack for the LTE system and configured to adapt and forward the data sent by the MS of the UMTS and the CN of the LTE system.

The UTRAN of the UMTS is directly connected to the MME and the SGW of the LTE through the S1 interface. The Iu PS interface protocol is replaced by the S1 interface protocol. On the control plane, the S1-AP of the S1 interface replaces the signaling management function of the RANAP of the Iu PS interface, and the transport layer uses the SCTP as a signaling bearer. On the user plane, an enhanced GTPU' protocol undertakes the functions of the user plane.

On the control plane, the MA is located above the RRC protocol and the S1-AP protocol of the UTRAN protocol stack; on the user plane, the MA is located above the PDCP and the GTPU'. The MA adapts the signaling process and the user-plane data transmission respectively, including: mobility and handover adaptation, NAS signaling adaptation, signaling forwarding between the RRC and the S1-AP, QoS parameter mapping between the LTE system and the 3G, security authentication, and user-plane addressing.

The control-plane MA in this embodiment includes a mobility management adapting unit, a session management adapting unit, and a signaling forwarding unit.

The mobility management adapting unit performs adaptation for the mobility process in the following way:

(1) The MA is located between the RRC and the S1-AP, and the MA adaptation keeps consistency of the MM state between the MME and the MS. The MS performs the GMM state process of the UMTS, and the MME performs the MM state process of the S1 interface.

(2) In the process of attach and detach, cell update, RA/location area update, and paging, the MA triggers or controls the S1-AP process to perform adaptation, and may construct a NAS message when necessary.

(3) The MA performs parameter conversion for the messages on the NAS or S1-AP layer, for example, security authentication parameters and QoS parameters.

The session management adapting unit adapts the session process in this way: After the S1 interface replaces the Iu PS interface, in the session process, the user-plane bearer (including GTPU tunnel and air interface resources) is set up/released through an S1-AP session management process.

The signaling forwarding unit reciprocally forwards the signaling message of the RRC layer of the air interface control-plane protocol stack for the UMTS and the S1-AP layer of the S1 interface control-plane protocol stack for the LTE system.

The user-plane MA in this embodiment includes a data forwarding unit, which reciprocally forwards the data on the PDCP layer of the air interface user-plane protocol stack for the UMTS and the GTPU' layer of the S1 interface user-plane protocol stack for the LTE system.

The following describes the service process of the "UMTS+S1 interface" network system with reference to FIG. 10, taking FIG. 11A to FIG. 11D as examples.

Figure 11A:
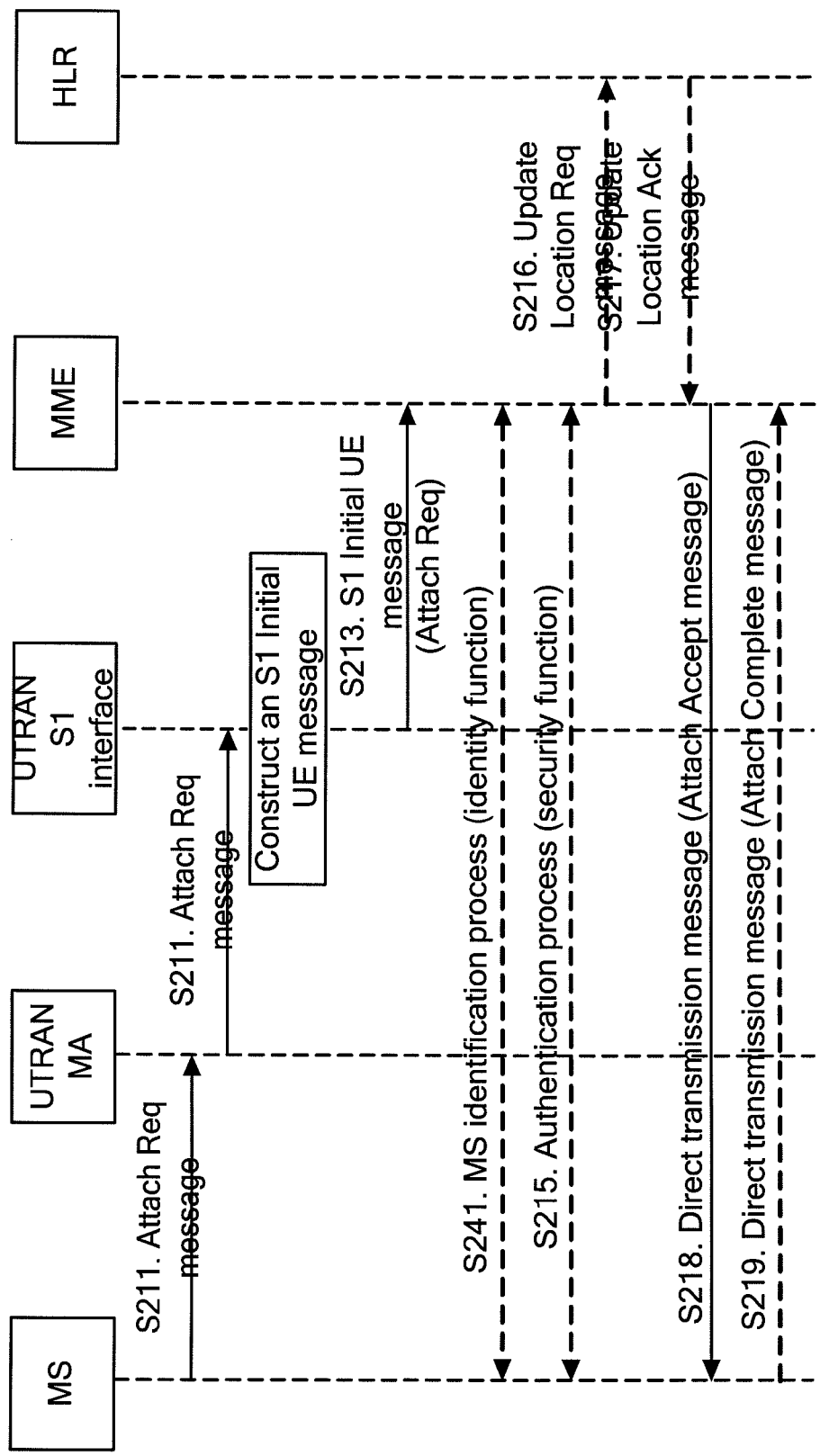
FIG. 11A to FIG. 11D are a flowchart of a message processing method in the service process of the network system shown in FIG. 10.

FIG. 11A is a flowchart of a message processing method of an attach process in the network system shown in FIG. 10, where the dotted line indicates optional steps.

Step S211: The MS of the UTRAN initiates an attach process, and sends the Attach Req message to the MA of the UTRAN.

Step S212: After receiving the Attach Req message, the MA of the UTRAN performs adaptation for the NAS message. The adaptation operations include: parsing the Attach Req message, and performing parameter conversion between the UMTS and the LTE system for the Attach Req message. Afterward, the MA forwards the Attach Req message to the S1-AP.

Step S213: The S1-AP of the S1 interface of the UTRAN constructs an S1 Initial UE message, and the UTRAN initiates an Initial UE process, and sends an S1 Initial UE message that carries an Attach Req to the MME through the S1 interface of the UTRAN.

Step S214: The MME initiates an identity function process.

Step S215: The MME initiates a security function process.

Steps S216 and S217: The MME initiates a location update process. In step S216, the MME sends an Update Location Req message to the HLR; in step S217, the HLR returns an Update Location Ack message to the MIME.

Step S218: The MME returns as Attach Accept message to the MS through a direct transfer message.

Step S219: If the TMSI is updated, the MS returns an Attach Complete message to the MME through a direct transfer message.

Figure 11B:
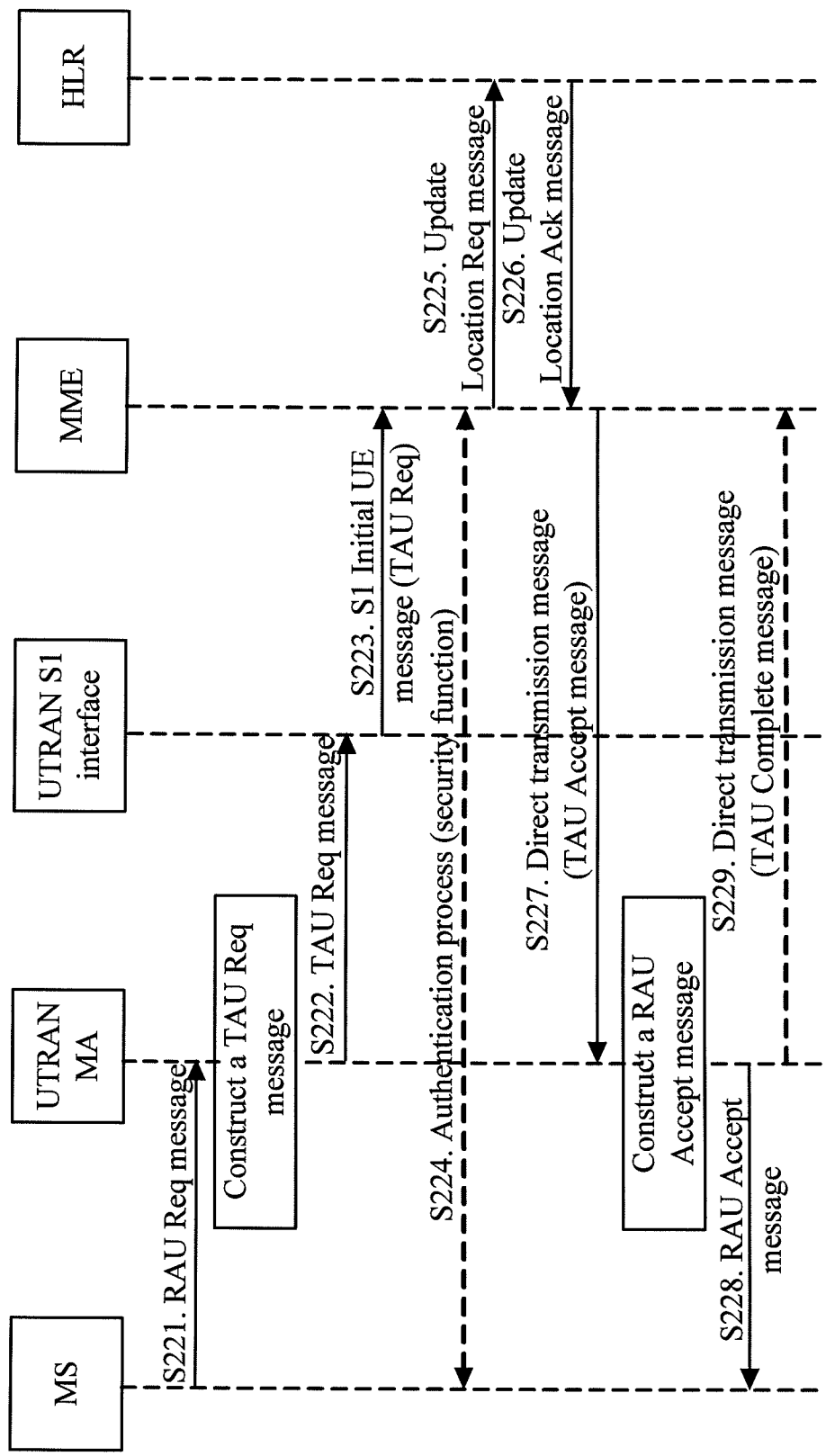

FIG. 11B is a flowchart of a message processing method of an RAU process (within the MME, across the UTRAN) in the network system shown in FIG. 10, where the dotted line indicates optional steps.

Step S221: After getting attached, the MS of the UMTS enters a new RA, and sends an RAU Req message to the new UTRAN.

Step S222: After receiving the RAU Req message, the MA of the UTRAN constructs a TAU Req message, and sends the message to the S1 interface.

Step S223: The S1 interface of the UTRAN constructs an S1 Initial UE message that carries a TAU Req, and sends the S1 Initial UE message to the MME.

Step S224: The MME initiates a security function process.

Steps S225 and S226: The MME initiates a location update process. In step S225, the MME sends an Update Location Req message to the HLR; in step S226, the HLR returns an Update Location Ack message to the MME.

Step S227: The MME returns a TAU Accept message to the MA of the UTRAN through a direct transfer message.

Step S228: After receiving the TAU Accept message, the MA of the UTRAN constructs an RAU Accept message, and sends the message to the MS.

Step S229: If a TMSI is reallocated, the MA constructs a TAU Complete message, and returns the TAU Complete message to the MME through a direct transfer message.

Figure 11C:
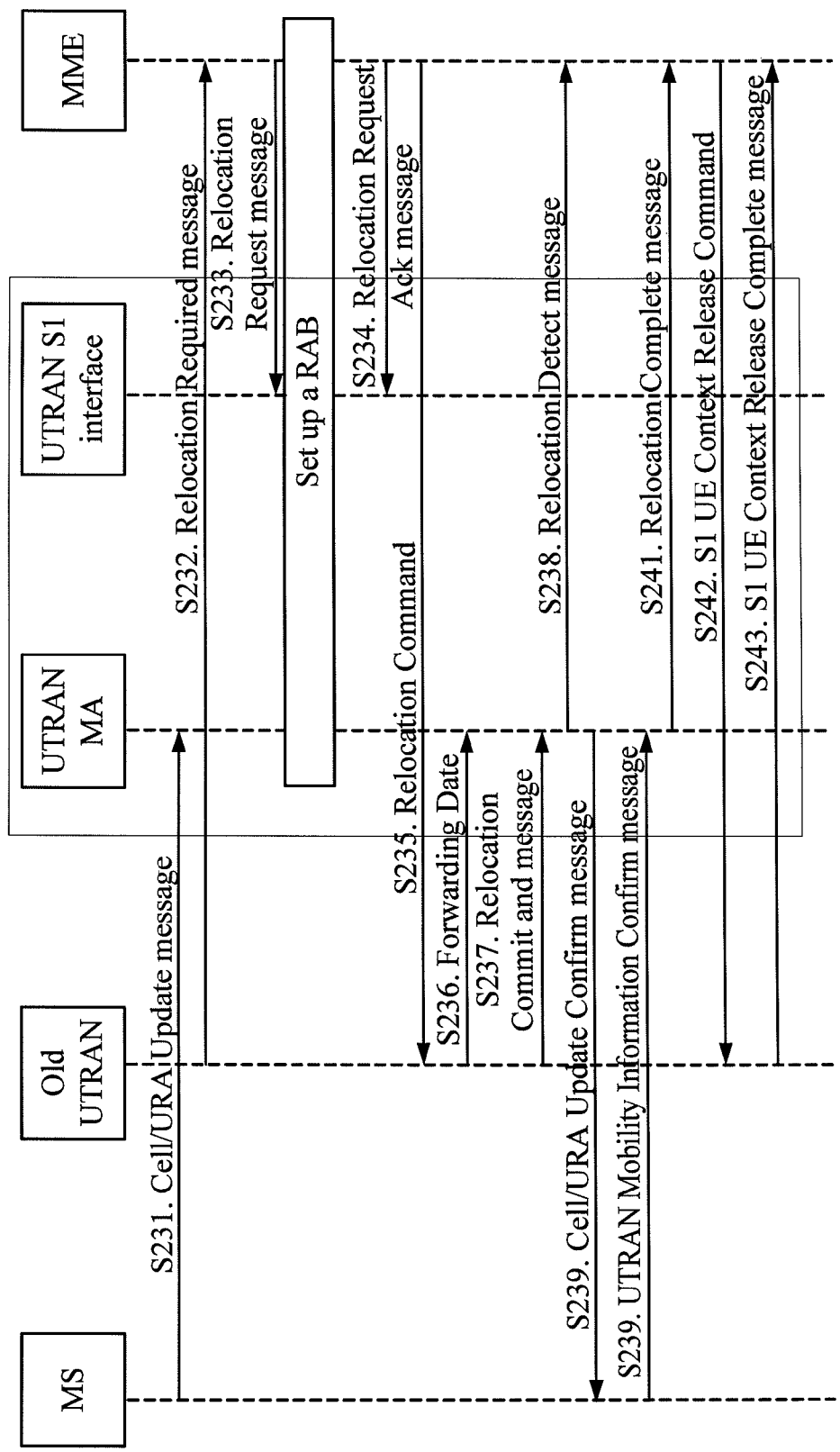

FIG. 11C is a flowchart of a message processing method of a cell update process and a relocation process (within the MME) in the network system shown in FIG. 10, where the dotted line indicates optional steps.

Step S231: After entering a new cell, the MS of the UTRAN sends a Cell/URA Update message to the MA of the new UTRAN.

Step S232: The old UTRAN sends a Relocation Required message to the MME.

Step S233: The MME sends a Relocation Request message to the new UTRAN through a UTRAN S1 interface.

Step S234: The MA of the new UTRAN sets up a RAB, and returns a Relocation Request Ack message to the MME.

Step S235: The MME sends a Relocation Command message to the old UTRAN.

Step S236: The old UTRAN and the new UTRAN forward data through an Iur interface.

Step S237: The old UTRAN sends a Relocation Commit message to the new UTRAN.

Step S238: The MA of the new UTRAN sends a Relocation Detect message to the MME.

Step S239: The MA of the new UTRAN sends a Cell/URA Update Confirm message to the MS.

Step S240: The MS returns a UTRAN Mobility Information Confirm message to the MA of the new UTRAN.

Step S241: The MA of the new UTRAN sends a Relocation Complete message to the MME.

Step S242: The MME sends an S1 UE Context Release Command to the old UTRAN.

Step S243: The old UTRAN returns an S1 UE Context Release Complete message to the MME.

Figure 11D:
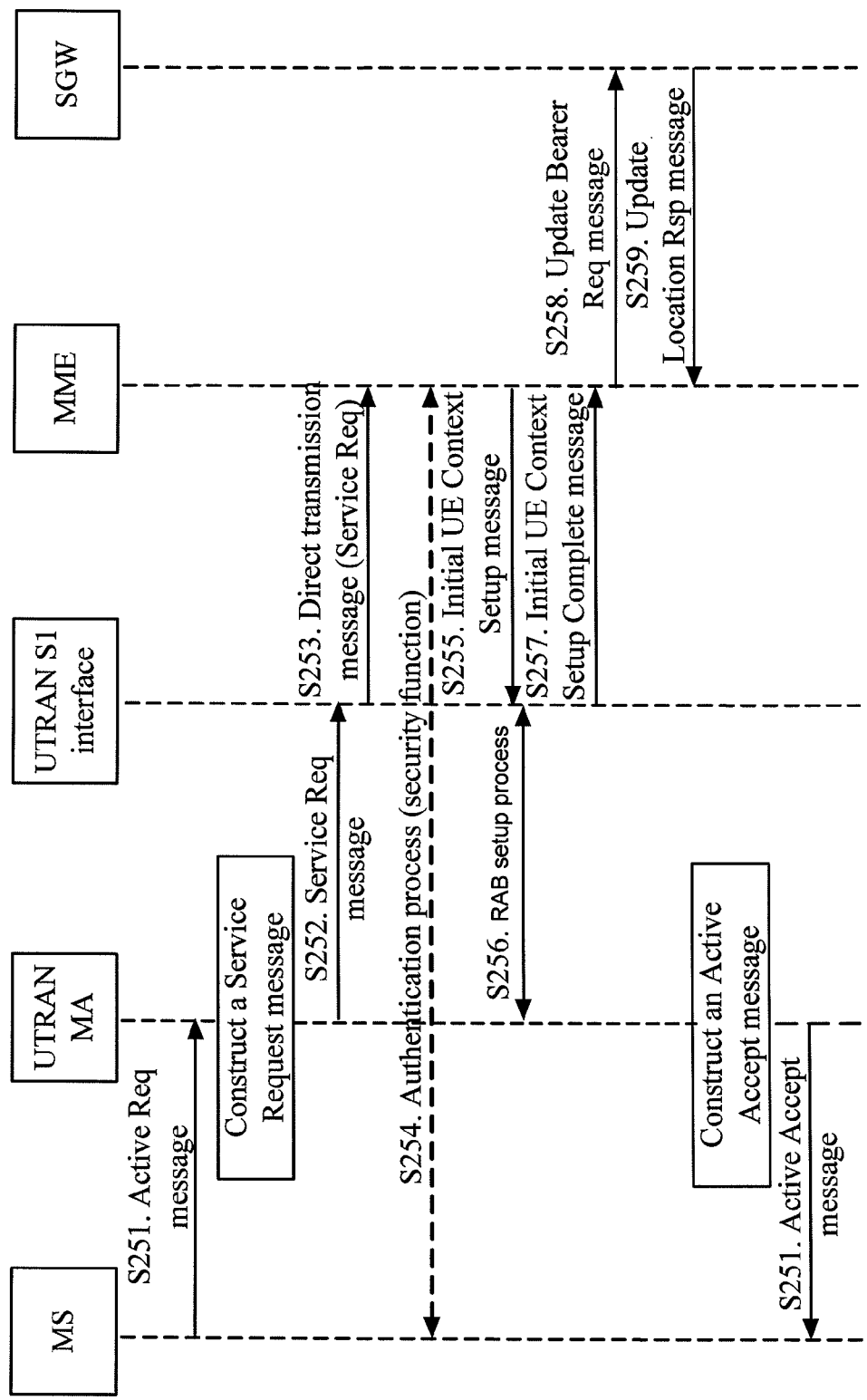

FIG. 11D is a flowchart of a message processing method of a session management process (PDP activation initiated by the MS) in the network system shown in FIG. 10, where the dotted line indicates optional steps.

Step S251: After getting attached, the MS of the UTRAN sends an Active Req message to the UTRAN.

Step S252: The MA of the UTRAN constructs a Service Request message, and sends the message to the S1 interface of the UTRAN.

Step S253: The S1 interface of the UTRAN constructs a Service Req message, and sends the message to the MME through a direct transfer message.

Step S254: The MME initiates a security function process.

Step S255: The MME initiates an initial context setup process, and sends an Initial UE Context Setup message to the S1 interface of the UTRAN.

Step S256: The UTRAN performs a bearer setup process.

Step S257: The UTRAN sends an Initial UE Context Setup Complete message to the MME.

Step S258: The MME sends an Update Bearer Req message to the SGW.

Step S259: After the bearer is updated, the SGW returns an Update Bearer Rsp message.

Step S260: The MA constructs a NAS message, namely, an Active Accept message, and returns the message to the MS.

The "UMTS+S1 interface" network system shown in FIG. 10 performs adaptation for the MS and the UTRAN in the 3G system and the CN in the LTE system through an MA of the UTRAN, and provides a practicable solution to evolution from the 3G network to the NGN. This embodiment has the following merits:

The structures of the access network and the CN are improved on the basis of retaining the UMTS air interface, and the LTE services are provided on the basis of the UMTS. In this way, the MS of the UMTS is backward compatible, and the existing investment is protected significantly.

The CN is shared with the LTE system, thus improving the network performance and enhancing evolution capabilities.

By using an MA, the solution involves little change of the existing UMTS network, and is easy to implement.

In conclusion, in the embodiments of the disclosure, an MA is applied in the BSS to achieve backward compatibility of the existing network and the MS in network evolution, and enable smooth evolution of the network.

It is necessary to note that the MA in the BSS performs adaptation to enable smooth evolution of the network without affecting the existing air interface in the case that the existing air interface needs to be utilized in the CN evolution. In fact, after the air interface is improved, the old CN needs to be utilized. Based on the same idea, the MA in the BSS may perform adaptation to improve the air interface without affecting the existing CN.

In the embodiments of the disclosure, the MA is applied in the mobile telecommunications system. For other mobile communication systems and fixed telephone systems, a terminal agent may be applied to ensure backward compatibility of the existing system and enable network evolution or terminal improvement.

Persons of ordinary skill in the art may understand that all or a part of the steps of the method according to the embodiments of the disclosure may be implemented by a program instructing relevant hardware. The program may be stored in a computer readable storage medium, such as a ROM, a RAM, a magnetic disk, or an optical disk.

The disclosure has been disclosed by some exemplary embodiments, but is not limited to those embodiments. Those skilled in the art may make various modifications and variations to the invention without departing from the spirit and scope of the invention. Therefore, the protection scope of the disclosure is subject to the appended claims.

What is claimed is:

1. A Radio Access Network (RAN), wherein the RAN communicating with a Mobile Station (MS) of a first network and a Core Network (CN) of a second network comprises:
   an air interface protocol stack for the first network;
   a CN interface protocol stack for the second network; and
   a Mobile Agent (MA), connected to an access layer of the air interface protocol stack for the first network and an access layer of the CN interface protocol stack for the second network, and configured to match and forward signaling messages and data sent by the MS of the first network and the CN of the second network;
   wherein
   the access layer of the air interface protocol stack for the first network comprises an access layer of an air interface control-plane protocol stack for the first network and an access layer of an air interface user-plane protocol stack for the first network;
   the access layer of the CN protocol stack for the second network comprises an access layer of a CN control-plane protocol stack for the second network and an access layer of a CN user-plane protocol stack for the second network; and
   the MA comprises:
   a control-plane MA, connected to the access layer of the air interface control-plane protocol stack for the first network and the access layer of the CN interface control-plane protocol stack for the second network, and configured to match and forward the signaling messages sent by the MS of the first network and the CN of the second network; and
   a user-plane MA, connected to the access layer of the air interface user-plane protocol stack for the first network and the access layer of the CN interface user-plane protocol stack for the second network, and configured to match and forward the data sent by the MS of the first network and the CN of the second network.

2. The RAN of claim 1, wherein
the control-plane MA is connected to a Logical Link Control (LLC) layer of the air interface control-plane protocol stack for the first network and a Radio Access Network Application Protocol (RANAP) layer of the CN interface control-plane protocol stack for the second network; and
the user-plane MA is connected to a Sub-Network Dependent Convergence Protocol (SNDCP) layer of the air interface user-plane protocol stack for the first network and a General Packet Radio System (GPRS) Tunneling Protocol for User Plane (GTPU) layer of the CN interface user-plane protocol stack for the second network.

3. The RAN of claim 1, wherein
the control-plane MA is connected to a Logical Link Control (LLC) layer of the air interface control-plane protocol stack for the first network and an S1 interface Application Protocol (S1-AP) layer of the CN interface control-plane protocol stack for the second network; and
the user-plane MA is connected to a Sub-Network Dependent Convergence Protocol (SNDCP) layer of the air interface user-plane protocol stack for the first network and a General Packet Radio System (GPRS) Tunneling Protocol for User Plane (GTPU) layer of the CN interface user-plane protocol stack for the second network.

4. The RAN of claim 1, wherein
the control-plane MA is connected to a Radio Resource Control (RRC) layer of the air interface control-plane protocol stack for the first network and an S1 interface Application Protocol (S1-AP) layer of the CN interface control-plane protocol stack for the second network; and
the user-plane MA is connected to a Packet Data Convergence Protocol (PDCP) layer of the air interface user-plane protocol stack for the first network and a General Packet Radio System (GPRS) Tunneling Protocol for User Plane (GTPU) layer of the CN interface user-plane protocol stack for the second network.

5. The RAN of claim 1, wherein the control-plane MA comprises:
a mobility management adapting unit, configured to convert the signaling messages of the MS of the first network into the signaling messages of the CN of the corresponding second network in a mobility management process, convert the signaling messages of the CN of the second network into the signaling messages of the MS of the corresponding first network, and keep consistency of a mobility management state between the MS of the first network and the CN of the second network;
a session management adapting unit, configured to convert the signaling messages of the MS of the first network into the signaling messages of the CN of the corresponding second network in a session management process, convert the signaling messages of the CN of the second network into the signaling messages of the MS of the corresponding first network, and set up or release a user-plane bearer; and
a signaling forwarding unit, configured to forward the converted signaling messages of the MS of the first network to the access layer of the air interface control-plane protocol stack for the first network, and forward the converted signaling messages of the CN of the second network to the access layer of the CN interface control-plane protocol stack for the second network.

6. The RAN of claim 1, wherein the user-plane MA comprises:
a data forwarding unit, configured to forward the data on the access layer of the air interface user-plane protocol stack for the first network to the access layer of the CN interface user-plane protocol stack for the second network, and forward the data on the access layer of the CN interface user-plane protocol stack for the second network to the access layer of the air interface user-plane protocol stack for the first network.

7. The RAN of claim 6, wherein the user-plane MA further comprises:
an identity mapping unit, configured to perform identity mapping for the data on the access layer of the air interface user-plane protocol stack for the first network or the access layer of the CN interface user-plane protocol stack for the second network.

8. A Mobile Agent (MA), wherein the MA located in a Radio Access Network (RAN) communicating with a Mobile Station (MS) of a first network and a Core Network (CN) of a second network comprises:
a control-plane MA, connected to an access layer of an air interface control-plane protocol stack for the first network in the RAN and an access layer of a CN interface control-plane protocol stack for the second network in the RAN, and configured to match and forward signaling messages sent by the MS of the first network and the CN of the second network; and
a user-plane MA, connected to an access layer of an air interface user-plane protocol stack for the first network in the RAN and an access layer of a CN interface user-plane protocol stack for the second network in the RAN, and configured to match and forward data sent by the MS of the first network and the CN of the second network;
wherein the control-plane MA comprises:
a mobility management adapting unit, configured to convert the signaling messages of the MS of the first network into the signaling messages of the CN of the corresponding second network in a mobility management process, convert the signaling messages of the CN of the second network into the signaling messages of the MS of the corresponding first network, and keep consistency of a mobility management state between the MS of the first network and the CN of the second network;
a session management adapting unit, configured to convert the signaling messages of the MS of the first network into the signaling messages of the CN of the corresponding second network in a session management process, convert the signaling messages of the CN of the second network into the signaling messages of the MS of the corresponding first network, and set up or release a user-plane bearer; and
a signaling forwarding unit, configured to forward the converted signaling messages of the MS of the first network to the access layer of the air interface control-plane protocol stack for the first network, and forward the converted signaling messages of the CN of the second network to the access layer of the CN interface control-plane protocol stack for the second network.

9. The MA of claim 8, wherein the user-plane MA comprises:
a data forwarding unit, configured to forward the data on the access layer of the air interface user-plane protocol stack for the first network to the access layer of the CN interface user-plane protocol stack for the second network, and forward the data on the access layer of the CN interface user-plane protocol stack for the second network to the access layer of the air interface user-plane protocol stack for the first network.

10. The MA of claim 9, wherein the user-plane MA further comprises:
an identity mapping unit, configured to perform identity mapping for the data on the access layer of the air interface user-plane protocol stack for the first network or the access layer of the CN interface user-plane protocol stack for the second network.

11. A network adaptation method, comprising:
converting a signaling message of a Mobile Station (MS) of a first network into a signaling message of a Core Network (CN) of a corresponding second network;
converting a signaling message of the CN of the second network into a signaling message of the MS of the corresponding first network;
forwarding the converted signaling message of the MS of the first network and data on an access layer of a CN interface protocol stack for the second network to an access layer of an air interface protocol stack for the first network; and
forwarding the converted signaling message of the CN of the second network and data on the access layer of the air interface protocol stack for the first network to the access layer of the CN interface protocol stack for the second network;
wherein
the process of forwarding the converted signaling message of the MS of the first network and the data on the access layer of the CN interface protocol stack for the second network to the access layer of the air interface protocol stack for the first network comprises forwarding the converted signaling message of the MS of the first network to an access layer of an air interface control-plane protocol stack for the first network and forwarding the data on an access layer of a CN interface user-plane protocol stack for the second network to an access layer of an air interface user-plane protocol stack for the first network; and
the process of forwarding the converted signaling message of the CN of the second network and the data on the access layer of the air interface protocol stack for the first network to the access layer of the CN interface protocol stack for the second network comprises forwarding the converted signaling message of the CN of the second network to an access layer of a CN interface control-plane protocol stack for the second network and forwarding the data on the access layer of the air interface user-plane protocol stack for the first network to the access layer of the CN interface user-plane protocol stack for the second network.

12. The network adaptation method of claim 11, further comprising:
keeping consistency of a mobility management state between the MS of the first network and the CN of the second network.

13. The network adaptation method of claim 11, further comprising:
performing identity mapping for the data on the access layer of the air interface user-plane protocol stack for the first network or the access layer of the CN interface user-plane protocol stack for the second network.

14. The network adaptation method of claim 11, wherein the process of converting the signaling message of the MS of the first network into the signaling message of the CN of the corresponding second network comprises producing the signaling message of the CN of the corresponding second network through parsing the signaling message of the MS of the first network and converting parameters.

15. The network adaptation method of claim 11, wherein the process of converting the signaling message of the MS of the first network into the signaling message of the CN of the corresponding second network comprises producing the signaling message of the CN of the corresponding second network according to a type of the signaling message of the MS of the first network.

16. The network adaptation method of claim 11, wherein the process of converting the signaling message of the CN of the second network into the signaling message of the MS of the corresponding first network comprises producing the signaling message of the MS of the corresponding first network through parsing the signaling message of the CN of the second network and converting parameters.

17. The network adaptation method of claim 16, wherein the process of converting the signaling message of the MS of the first network into the signaling message of the CN of the corresponding second network comprises producing the signaling message of the CN of the corresponding second network according to the signaling message and a mobility management state of the MS of the first network.

* * * * *